United States Patent
Kakumaru et al.

(10) Patent No.: US 8,040,839 B2
(45) Date of Patent: Oct. 18, 2011

(54) RADIO TERMINAL UNIT, RADIO COMMUNICATION SYSTEM AND COMMUNICATION CONTROL METHOD

(75) Inventors: Takahiro Kakumaru, Tokyo (JP); Shinichi Morimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 735 days.

(21) Appl. No.: 12/073,028

(22) Filed: Feb. 28, 2008

(65) Prior Publication Data

US 2008/0175181 A1 Jul. 24, 2008

Related U.S. Application Data

(62) Division of application No. 10/784,871, filed on Feb. 24, 2004, now Pat. No. 7,362,720.

(30) Foreign Application Priority Data

Feb. 25, 2003 (JP) .................. 2003-046991

(51) Int. Cl.
*H04W 4/00* (2009.01)
(52) U.S. Cl. .................. 370/328; 370/514; 455/509
(58) Field of Classification Search .................. None
See application file for complete search history.

(56) References Cited

U.S. PATENT DOCUMENTS

| | | | |
|---|---|---|---|
| 5,276,680 A * | 1/1994 | Messenger | 370/311 |
| 6,611,508 B1 | 8/2003 | Abe | |
| 6,728,270 B1 | 4/2004 | Meggers et al. | |
| 6,954,651 B2 | 10/2005 | Yamato | |
| 7,362,720 B2 * | 4/2008 | Kakumaru et al. | 370/328 |
| 2008/0176592 A1 * | 7/2008 | Kakumaru et al. | 455/512 |

FOREIGN PATENT DOCUMENTS

| | | |
|---|---|---|
| JP | 9-83427 | 3/1997 |
| JP | 9162798 | 6/1997 |
| JP | 2002-291063 | 10/2002 |
| JP | 2004-187002 | 7/2004 |

OTHER PUBLICATIONS

Hideaki Manuyama et al, "Proposal of Communication Control Technique for Power Saving on Wireless Environment", IPSJ Symposium Series, Information Processing Society of Japan, vol. 2001 No. 16, Nov. 19, 2001, p. 25-32.
Motegi et al., "Adaptive Battery Conservation Management for Multimedia Mobile Packet Communications.," The Institute of Electronics Information and Communicatin Engineers, Technical Report NS2001—224-256 Mar. 2002, vol. 101, No. 714. pp. 135-140.

* cited by examiner

*Primary Examiner* — Erika Gary
(74) *Attorney, Agent, or Firm* — Young & Thompson

(57) ABSTRACT

A radio terminal unit and a radio communication system, enabling power savings, the improvement of the quality of real-time communication such as voice communication, and the reduction of transmission delays which often occur when a plurality of radio terminal units are connected to one radio base station. A radio terminal unit comprises an operation mode of communication application determination unit for determining operation mode of one or more communication which is operated at the radio terminal unit, a control packet changing unit for changing a timing of transmission of the control packet according to the operation mode of one or more communication applications determined by the operation mode of communication application determination unit, and a communication control section for sending the control packet according to the timing of transmission changed by the control packet changing unit after the transmission of data from the application.

11 Claims, 14 Drawing Sheets

FIG. 10
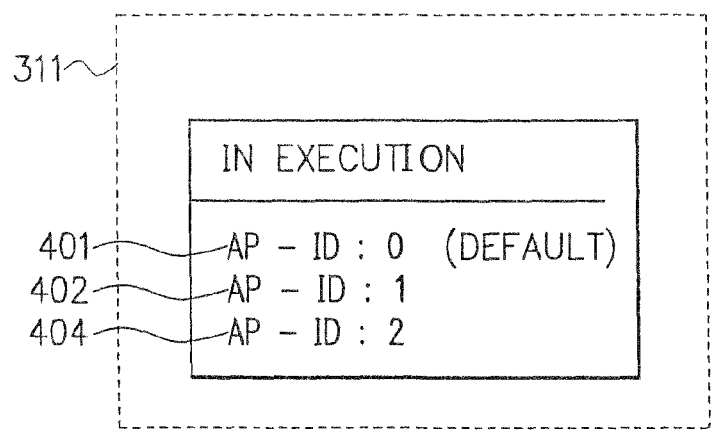
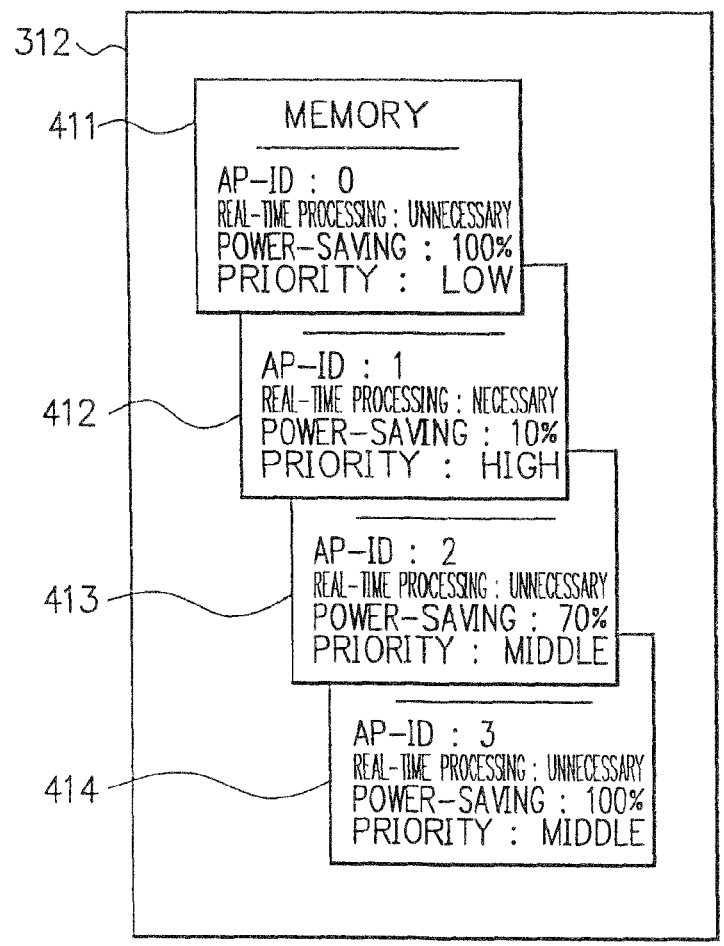

F I G. 11
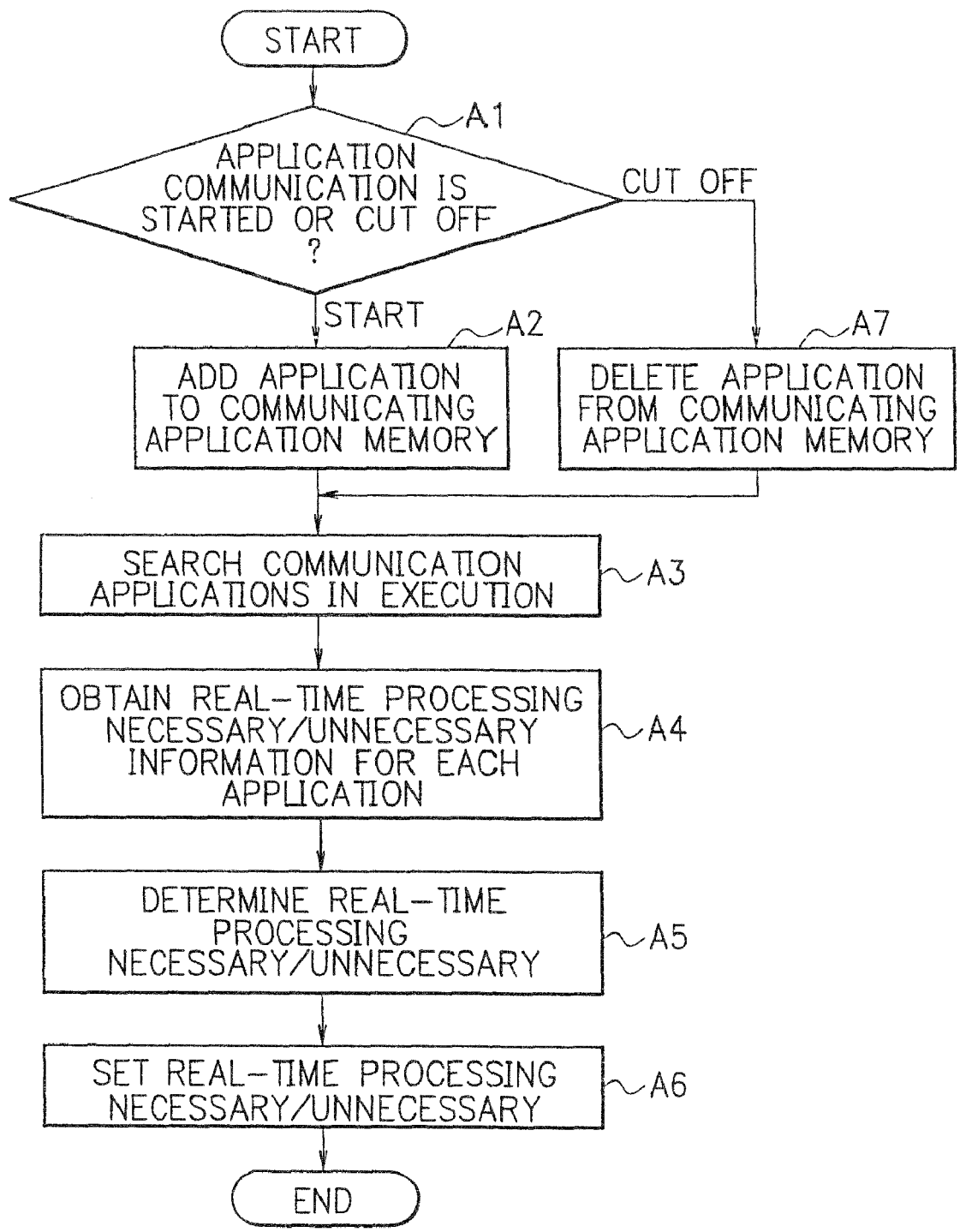

RADIO TERMINAL UNIT, RADIO COMMUNICATION SYSTEM AND COMMUNICATION CONTROL METHOD

FIELD OF THE INVENTION

The present invention relates to a radio terminal unit and a radio communication system including the same, and more particularly, to a radio terminal unit, a radio communication system and a communication control method, in which a radio base station connected to each radio terminal unit by radio as a transmission medium is connected to a LAN (Local Area Network) or a WAN (Wide Area Network).

BACKGROUND OF THE INVENTION

In a conventional wireless LAN system making use of radio as a transmission medium, for example, in a radio communication system disclosed in Japanese Patent Application laid open No. HEI9-162798 (FIGS. 14 and 20), power-saving operation in a radio terminal unit is carried out by intermittently receiving beacons from a radio base station. Besides, it is required to receive at least a beacon having a delivery traffic indication map (DTIM) in order to obtain a multicast/broadcast packet.

That is, when a radio terminal unit enters power-saving mode, the radio terminal unit obtains a beacon transmitted from a radio base station. Having extracting respective information elements included in the beacon, the radio terminal unit carries out intermittent receiving operation based on beacon interval information included within the beacon and an interval between the transmission of beacons each having a delivery traffic indication map (hereinafter referred to as "DTIM").

When operating in power-saving mode, the radio terminal unit informs the radio base station of its operation using a frame control field. The radio base station buffers packets addressed to the radio terminal unit operating in power-saving mode in a memory within the radio base station, and informs the radio terminal unit that the packets have been buffered by a traffic indication map (hereinafter referred to as "TIM") included in a beacon.

As just described, a radio terminal unit operating in power-saving mode receives beacons intermittently from a radio base station. After receiving each beacon, the radio terminal unit extracts information elements. Having recognized from the TIM that the packets sent to the radio terminal unit itself had been buffered, the radio terminal unit sends the radio base station a control packet (hereinafter referred to as "PS-Poll") requesting to deliver the buffered packets. Thus, the radio terminal unit receives its packets buffered by the radio base station.

Additionally, a multicast/broadcast packet is sent to the radio terminal unit subsequent to a beacon with the DTIM. The radio terminal unit receives at least a beacon with the DTIM in order to obtain the multicast/broadcast packet.

A power saving to the radio terminal unit can be achieved by lengthening the interval between the receiving of beacons from the radio base station if there is no traffic. However, in the case where there are packets for the radio terminal unit when the receiving interval has been lengthened, the radio terminal unit can be late in obtaining the TIM, which causes delay in receiving the packets.

Besides, the radio base station buffers packets addressed to the radio terminal unit operating in power-saving mode in its memory. Consequently, when the receiving interval is lengthened on the radio terminal unit operating in power-saving mode, delivery of packets to the radio terminal unit is delayed. Thus, the radio base station has to retain the packets in the memory for a long period.

In the real-time communication of voice, moving images, etc., if the radio terminal unit which is in power-saving mode repeats transmission and reception at long receiving intervals, packets addressed to the radio terminal unit are once buffered by the radio base station. The buffered packets are delivered to the radio terminal unit in the next receiving period, and, therefore, delay occurs in packet delivery. Especially, in the real-time communication of voice, moving images, etc., delay occurs in receiving packets on the radio terminal unit, which may cause a problem in the reproducibility of data.

In addition, the radio terminal unit in power-saving mode carries out the intermittent receiving operation in timing with transmission of beacons each having the DTIM from the radio base station. That is, the radio terminal unit cannot determine the timing of the intermittent receiving operation.

Moreover, in the case where a plurality of radio terminal units are connected to the same radio base station and operate in power-saving mode, the respective radio terminal units have to perform the intermittent receiving operation based on the same intermittent receiving timing, that is, the timing of transmission of beacons each having the DTIM from the radio base station.

Further, the multicast/broadcast packet is sent to the radio terminal unit subsequent to a beacon with the DTIM. Therefore, the radio terminal unit, which operates in power-saving mode at long receiving intervals without reference to the beacon having the DTIM, may not be able to receive the multicast/broadcast packet. For example, in the case where a physical address resolution protocol message (ARP) is issued in a network for inquiring the physical address of the radio terminal unit operating in power-saving mode, delay occurs in delivery to the radio terminal unit. As a result, the network is congested with the traffic caused by retransmission.

Still further, in the wireless LAN communication, the CSMA/CA (Carrier Sense Multiple Access protocol with Collision Avoidance) procedure is performed in order to avoid a collision during data transmission. Regardless of communicating application, the same DIFS (Distributed Inter Frame Space) is applied to every PS-Poll which the radio terminal unit transmits for requesting a radio base station to send packets buffered therein when the radio terminal unit is operating in power-saving mode. Therefore, it is impossible to minimize delays and to give transmission right preferentially to real-time communication such as voice communication.

Moreover, the back off algorithm is used when data are to be transmitted. That is, data are actually transmitted when random wait time has passed after the transmission right was given. Consequently, it is required to wait the random time regardless of the contents of send data, which makes it impossible to minimize delays in real-time communication such as voice communication.

In order to solve the above-mentioned problems, the inventors have proposed "a radio terminal and a radio communication system using the same" in Japanese Patent Application No. 2002-291063. The radio communication system comprises a radio base station and radio terminal units each being connected with a LAN or a WAN.

FIG. 1 is a timing chart illustrating the operation of the conventional radio communication system for transmission and reception. In the following, the operation of the radio communication system will be schematically described referring to FIG. 1.

Referring to FIG. 1, the radio terminal units 610, 620 and 630 belong to a radio base station 600. The radio base station 600 once buffers packets to the radio terminal units that carry out the intermittent receiving operation, and sends the packets to the respective radio terminal units on receipt of the PS-Poll (a control packet for requesting a radio base station to deliver buffered packets).

The radio terminal units 610, 620 and 630 perform the intermittent receiving operation at different intervals, respectively, in synchronism with multiples of beacons transmitted by the radio base station 600 at a regular time interval. The intermittent receiving interval for each of the radio terminal units 610, 620 and 630 is determined according to the operation mode of one or more communication applications running on each terminal unit. In the example of FIG. 1, a "web browser" application is active on the radio terminal unit 610, a "chat" application is active on the radio terminal unit 620, and a "VoIP" (Voice over Internet Protocol) application is active on the radio terminal unit 630. The intermittent receiving interval is selected from divisors of the interval between the transmission of DTIM beacons (beacons each containing the DTIM) within the range of the beacon interval (an interval between the transmission of respective beacons) to the DTIM beacon interval (an interval between the transmission of respective DTIM beacons). In other words, the shortest intermittent receiving interval is the beacon interval, and the longest is the DTIM beacon interval. Accordingly, each radio terminal unit can change the intermittent receiving interval depending on the operation mode of the application running on it. Thereby power-saving control on the radio terminal unit can be executed accurately.

Besides, the radio terminal units 610, 620 and 630 can maintain the priorities of the PS-Polls transmitted to the radio base station 600. Such priorities are set based on the operation mode of the application running on the radio terminal units 610, 620 and 630. Consequently, packets of real-time communication such as voice packets can be preferentially transmitted. Thus, it is possible to reduce delays and improve voice quality.

With the conventional technique, each radio terminal unit transmits the PS-Poll to the radio base station triggered by the receipt of a beacon so as to receive packets addressed to it. In the case where a plurality of radio terminal units are connected to one radio base station and a communication application that is required to perform real-time processing, such as a VoIP application, is running on the respective terminal units, the plural terminal units send the PS-Polls to the radio base station, respectively, each time they receive beacons. Consequently, it is highly likely that the period of wait time from when the transmission right was given to data to when the data are actually transmitted is prolonged. As a result, delays are increased, which affects voice quality.

SUMMARY OF THE INVENTION

It is therefore an object of the present invention to provide a radio terminal unit, a radio communication system and a communication control method, more specifically, a radio terminal unit and a radio communication system, in which a radio base station connected to one or more radio terminal units using radio as a transmission medium is connected to a LAN (Local Area Network) or a WAN (Wide Area Network), capable of saving electric power of the radio terminal unit as well as improving the quality of communication through a communication application that requires real-time processing, that is, the quality of real-time communication such as voice communication.

It is another object of the present invention to provide a radio terminal unit and a radio communication system, capable of shortening the period of wait time before transmission which may be prolonged when a plurality of radio terminal units are connected to one radio base station.

In accordance with an aspect of the present invention, to achieve the above object, there is provided a radio terminal unit which runs in power-saving mode and a radio base station a control packet for requesting delivery so as to receive packets buffered by the radio base station, comprising:

an operation mode of communication application determination unit for determining operation mode of one or more communication which is operated at the radio terminal unit;

a control packet changing unit for changing a timing of transmission of the control packet according to the operation mode of one or more communication applications determined by the operation mode of communication application determination unit; and a communication control section for sending the control packet according to the timing of transmission changed by the control packet changing unit after the transmission of data from the application.

There may be provided the radio terminal unit according to the present invention as follows.

Preferably, a timing of transmission of the control packet is changed by the control packet changing unit regardless of a beacon interval.

Preferably, the communication control section selects whether or not to transmit the control packet according to the operation mode of one or more communication applications which are determined by the operation mode of communication application determination unit.

Preferably, the communication control section requests a power control section to turn on the power when the control packet is transmitted.

Preferably, the communication control section requests a power control section to turn off the power after the data reception by the control packet.

In accordance with another aspect of the present invention, there is provided a radio communication system which is a radio network system, comprising one or more radio base stations and one or more radio terminal units runs in power-saving mode and a radio base station a control packet for requesting delivery so as to receive packets buffered by the radio base station, comprising:

an operation mode of communication application determination unit for determining operation mode of one or more communication which is operated at the radio terminal unit;

a control packet changing unit for changing a timing of transmission of the control packet according to the operation mode of one or more communication applications determined by the operation mode of communication application determination unit; and a communication control section for sending the control packet according to the timing of transmission changed by the control packet changing unit after the transmission of data from the application.

In accordance with an aspect of the present invention, to achieve the above object, there is provided a communication control method of a radio terminal unit which runs in power-saving mode and a radio base station a control packet for requesting delivery so as to receive packets buffered by the radio base station, comprising an operation mode of communication application determination step of determining operation mode of one or more communication which is operated at the radio terminal unit and a communication control step of sending the control packet after the transmission data from the application according to the timing of transmission of the control packet changed according to the operation mode of one or more communication applications determined by the operation mode of communication application determination step.

There may be provided the communication control method according to the present invention as follows.

Preferably, a timing of transmission of the control packet is changed by the communication control step regardless of a beacon interval.

Preferably, the communication control step selects whether or not to transmit the control packet according to the operation mode of one or more communication applications which are determined by the operation mode of communication application determination step.

Preferably, the communication control step requests a power control section to turn on the power when the control packet is transmitted.

Preferably, the communication control step requests a power control section to turn off the power after the data reception by the control packet.

BRIEF DESCRIPTION OF THE DRAWINGS

The objects and features of the present invention will become more apparent from the consideration of the following detailed description taken in conjunction with the accompanying drawings in which:

FIG. 10 is a diagram showing examples of the contents of a communicating application memory and a parameter memory depicted in FIG. 9;

FIG. 11 is a flowchart for explaining the operation of the radio terminal unit for determining whether real-time processing is necessary or unnecessary based on communication applications according to the fourth embodiment of the present invention;

DESCRIPTION OF THE PREFERRED EMBODIMENTS

Figure 1:
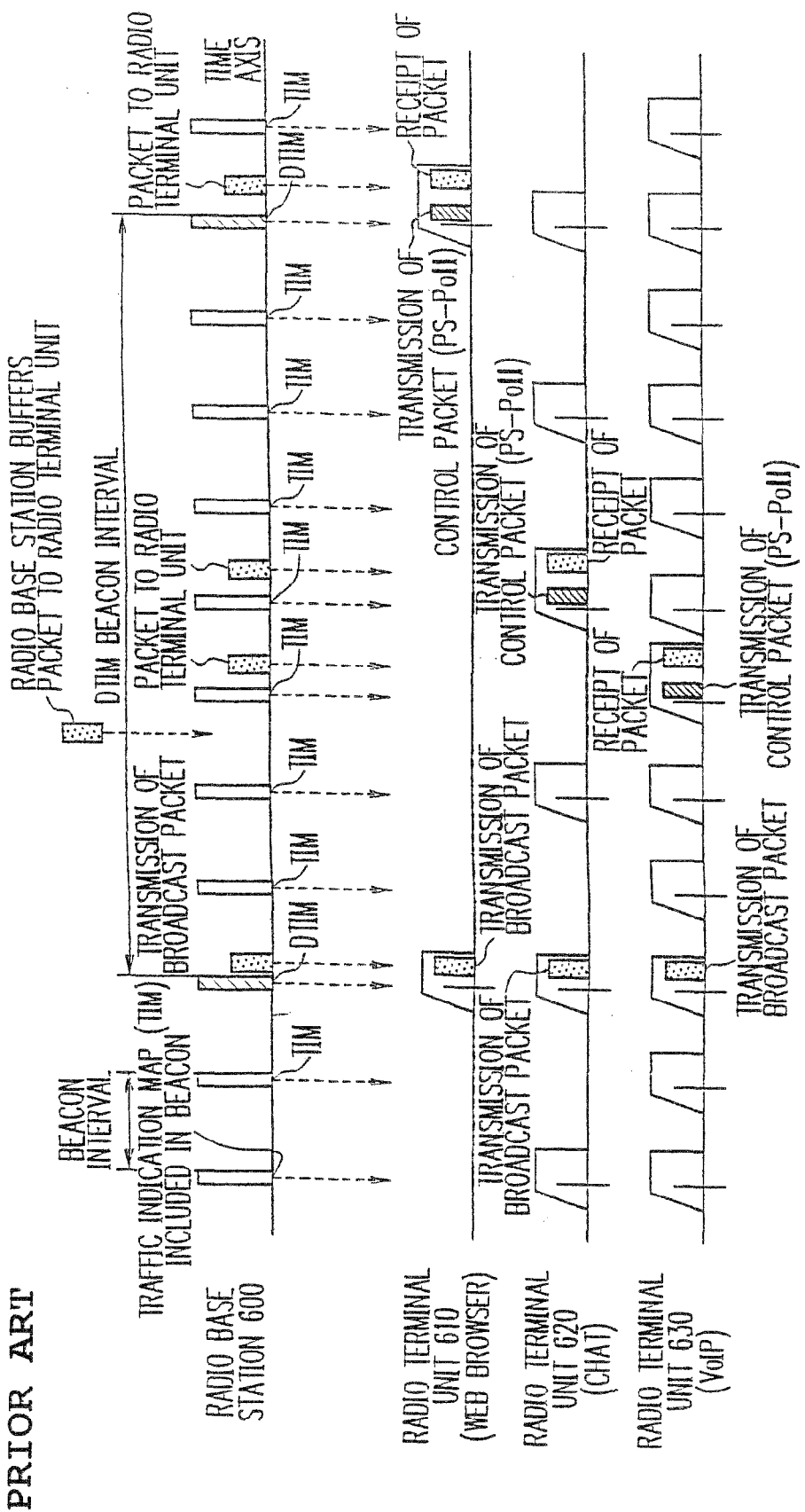
FIG. 1 is a timing chart illustrating the operation of a conventional radio communication system for transmission and reception.
Figure 2:
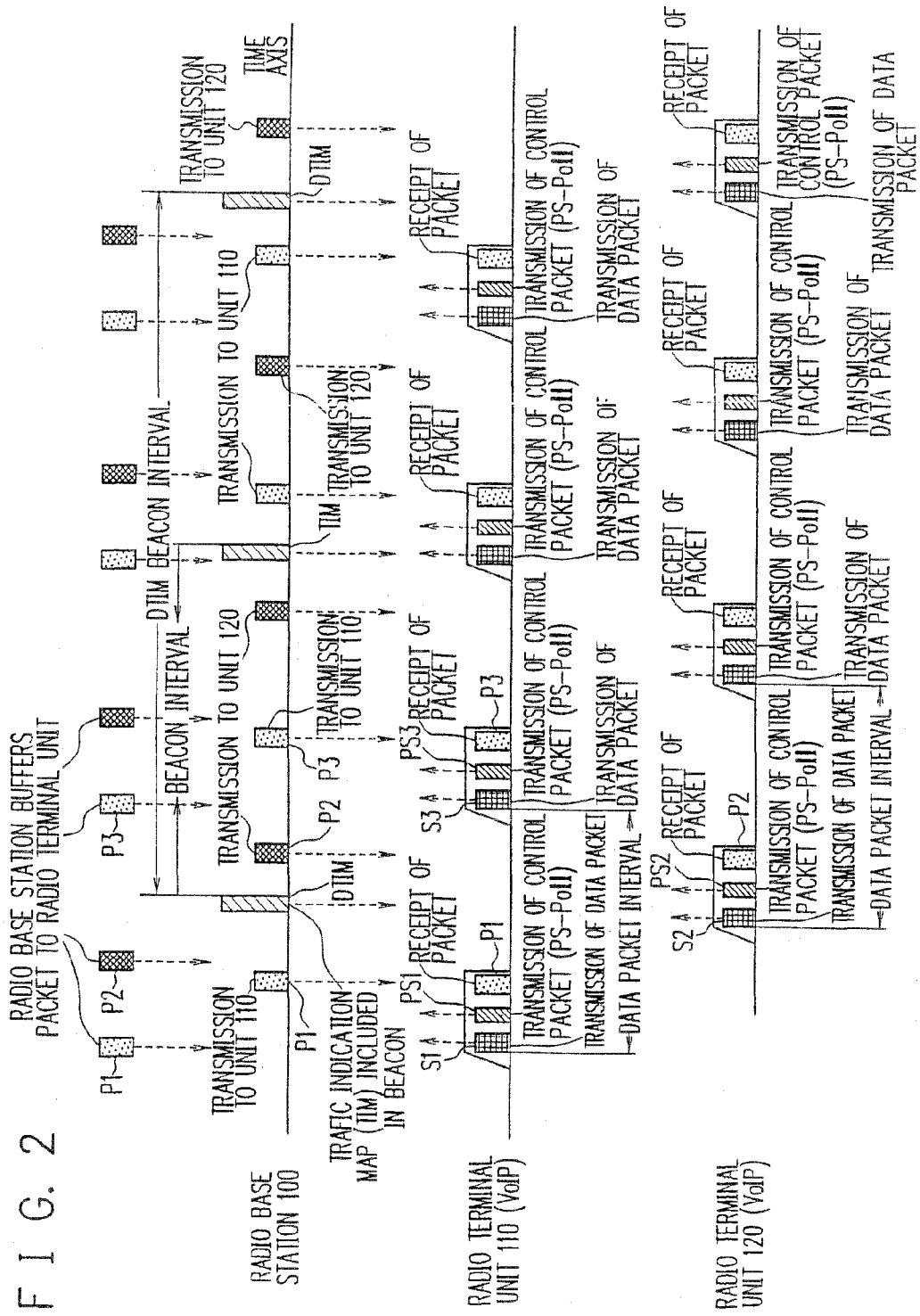
FIG. 2 is a timing chart illustrating the operation of a radio communication system according to the first embodiment of the present invention.

FIG. 2 is a timing chart illustrating the operation of a radio communication system according to the first embodiment of the present invention. In the following, the operation of the radio communication system will be schematically described referring to FIG. 2.

In FIG. 2, the radio communication system includes a radio base station 100 and radio terminal units 110 and 120. The radio terminal units 110 and 120 belong to the radio base station 100. The radio base station 100 once buffers packets addressed to the radio terminal units 110 and 120 that carry out intermittent receiving operation, and sends the packets to the respective radio terminal units 110 and 120 on receipt of transmission requests from them.

The radio terminal units 110 and 120 are enabled for transmission and reception in synchronism with the timing of transmission of data generated by communication applications running on the respective radio terminal units 110 and 120. After transmitting the data, the radio terminal units 110 and 120 successively transmit the PS-Polls, respectively, to the radio base station 100 for requesting packets which have been buffered by the radio base station 100. When there are buffered packets to the radio terminal units 110 and 120, the radio base station 100 sends the packets to them. As for the timing of transmission of data generated by a communication application running on the radio terminal unit, if the communication application requires real-time processing and real-time communication is executed by employing, for example, VoIP (Voice over Internet Protocol), packets are generated at regular intervals. When the communication application generates the packets, for example, at intervals of 20 milli-seconds, the radio terminal unit transmits the PS-Polls at intervals of 20 milli-seconds.

In a conventional radio communication system, radio terminal units carry out the intermittent receiving operation based on beacons transmitted from a radio base station at regular intervals. Therefore, the beacon interval (an interval between the transmission of respective beacons) has to be set at a minute value such as 20 milli-seconds. If the beacon interval is lengthened and beacons are transmitted at intervals of, for example, 200 milli-seconds, there is a high possibility that delay occurs in the receipt of packets. However, in accordance with the present invention, it is possible to resolve such problems.

Besides, in a conventional radio communication system where each radio terminal unit transmits the PS-Poll to a radio base station in synchronism with the receipt of a beacon, a plurality of radio terminal units may transmit the PS-Polls for requesting delivery of buffered packets to one radio base station all at once immediately after the receipt of a beacon. Therefore, the radio terminal units are highly likely to be placed in the transmission wait state. In other words, the period of wait time before transmission may be prolonged. However, in accordance with the present invention, the radio terminal units 110 and 120 transmit the PS-Polls to the radio base station 100, respectively, based on the timing of transmission of data therefrom. Thereby, the possibility that the radio terminal units 110 and 120 are placed in the transmission wait state is reduced. Thus, it is possible to cut down delays and improve voice quality in real-time communication such as voice communication.

Referring now to the drawings, a description of preferred embodiments of the present invention will be given in detail.

Figure 3:
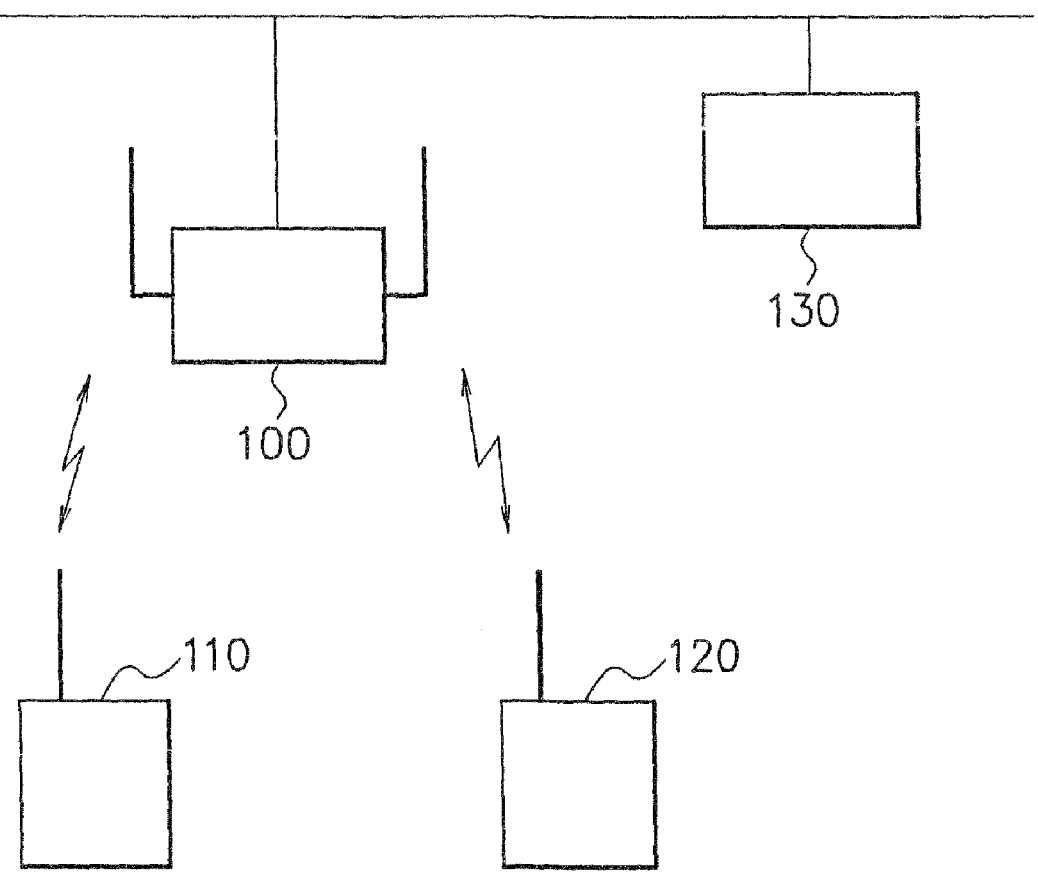
FIG. 3 is a diagram showing the configuration of a radio network system according to the first embodiment of the present invention.

FIG. 3 is a diagram showing the configuration of a radio communication system according to the first embodiment of the present invention. Referring to FIG. 3, the radio communication system comprises the radio base station 100 connected to a LAN (Local Area Network) or a WAN (Wide Area Network), the radio terminal units 110 and 120, and a terminal unit 130 connected to a LAN or a WAN. The network system provides communication of voice, moving images and the like.

After recognizing that each of the radio terminal units 110 and 120 enters power-saving mode on receipt of a control packet therefrom, the radio base station 100 buffers packets to the terminal units 110 and 120 in a memory within the base station 100, and informs the terminal units 110 and 120 of the buffered packets by the TIM included in each beacon.

The radio terminal units 110 and 120 can communicate with the terminal unit 130 connected to a LAN or a WAN via the radio base station 100 by the internet protocol (IP). The radio terminal units 110 and 120 conduct connection negotiations with the radio base station 100 using a wireless physical layer to thereby participate in the network. After the negotiations are concluded, the radio terminal units 110 and 120 each receive a beacon from the radio base station 100, and extract respective information elements included in the beacon to obtain the beacon interval. After that, radio terminal units 110 and 120 operate in intermittent receiving mode at DTIM beacon intervals, or intervals between the transmission of respective DTIM beacons (beacons each containing the DTIM).

Figure 4:
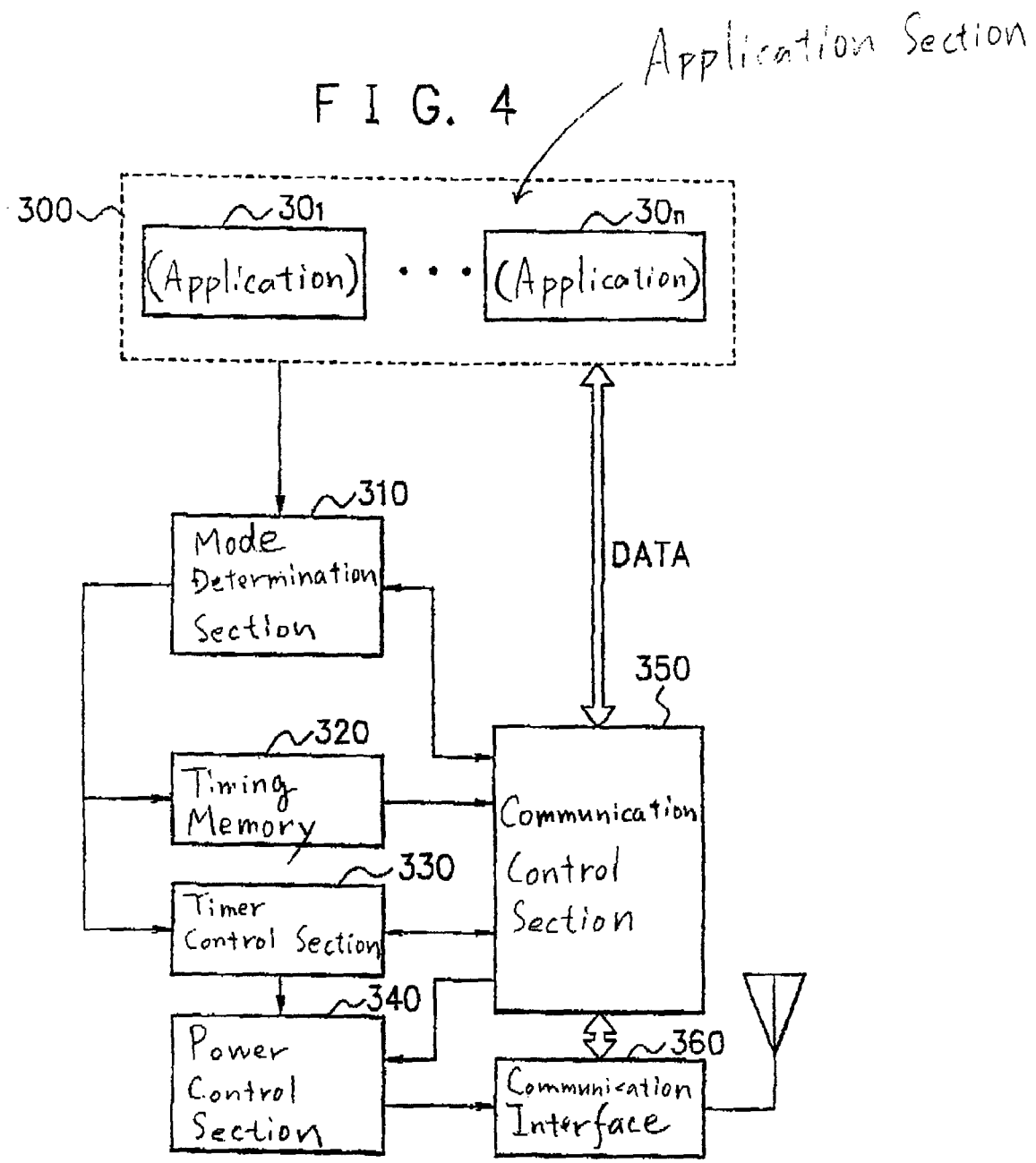
FIG. 4 is a block diagram showing the configuration of a radio terminal unit according to the first embodiment of the present invention.

FIG. 4 is a block diagram showing the configuration of the radio terminal unit according to the first embodiment of the present invention. Referring to FIG. 4, the radio terminal unit (110, 120) comprises a communication application section 300, an operation mode determination section 310, a PS-Poll transmission timing memory 320, a timer control section 330, a power control section 340, a communication control section 350, and a radio communication interface section 360.

The communication application section 300 represents communication applications which are running on the radio terminal unit. While, in FIG. 4, the communication application section 300 indicates that n (n; an integer larger than 1) pieces of communication applications $30_i$ to $30_n$ are active, there may be no active application. When a communication application is activated, the communication application section 300 sets necessary parameters for the communication application in the operation mode determination section 310. In addition, the communication application section 300 informs the operation mode determination section 310 as to the start and cutoff of communication. The communication application section 300 transmits/receives data through the communication control section 350.

The operation mode determination section 310 keeps activated communication applications and parameters corresponding to the respective applications. Those values are set by the communication application section 300. The operation mode determination section 310 sets appropriate values in the PS-Poll transmission timing memory 320 and the timer control section 330, respectively, based on the parameters of each application which is currently in communication set by the communication application section 300.

The PS-Poll transmission timing memory 320 stores the timing of transmission of the PS-Poll corresponding to the active communication applications. The transmission timing is utilized by the communication control section 350. The operation mode determination section 310 determines and sets this value in the PS-Poll transmission timing memory 320.

The timer control section 330 operates when there is no active communication application that requires real-time processing. The timer control section 330 obtains the intermittent receiving interval from the operation mode determination section 310, and continues to provide the power control section 340 with a timer value at intervals corresponding to the obtained intermittent receiving interval. Additionally, the timer control section 330 have a function for correcting the timer value according to the beacon receiving timing obtained from the communication control section 350. The communication control section 350 informs the timer control section 330 as to a transition from a real-time processing unnecessary state (in which no communication application requires real-time processing) to a real-time processing necessary state (in which there is at least one communication application that requires real-time processing) and vice versa. In other words, the timing in which the timer control section 330 starts or stops operating as a timer is determined by the communication control section 350.

The power control section 340 repeatedly turns on or off the power of the radio communication interface section 360 in response to a power on/off request from the communication control section 350. Besides, the power control section 340 repeatedly turns on the power of the radio communication interface section 360 based on the timer value fed by the timer control section 330, and turns off the power of the radio communication interface section 360 in response to the power off request from the communication control section 350.

The communication control section 350 controls the radio communication interface section 360 to transmit data from the communication application section 300 and to feed the section 300 with data received through the section 360. The communication control section 350 also conducts the negotiations with the radio base station 100. Having received send data from the communication application section 300, the communication control section 350 sends the power on request to the power control section 340 in order to turn on the power of the radio communication interface section 360. After all the data received from the communication application section 300 have been transmitted, the communication control section 350 determines whether or not to transmit the PS-Poll to the radio base station 100 based on information from the PS-Poll transmission timing memory 320. When the communication control section 350 determines not to transmit the PS-Poll, the section 350 sends the power off request to the power control section 340 in order to turn off the power of the radio communication interface section 360. On the other hand, when the communication control section 350 determines to transmit the PS-Poll, the section 350 transmits the PS-Polls to the radio base station 100 through the radio communication interface section 360. Having received all packets corresponding to the transmitted PS-Polls, the communication control section 350 sends the power off request to the power control section 340. In addition, the communication control section 350 determines whether real-time processing is necessary or unnecessary based on information from the PS-Poll transmission timing memory 320. When the real-time processing necessary state changes to the real-time processing unnecessary state, the communication control section 350 instructs the timer control section 330 to start operating as a timer. In contrast, when the real-time processing unnecessary state changes to the real-time processing necessary state, the communication control section 350 instructs the timer control section 330 to stop operating as a timer.

The radio communication interface section 360 transmits data received from the communication control section 350 by radio. The radio communication interface section 360 also receives data sent by radio from the radio base station 100, and forwards the data to the communication control section 350. The power of the radio communication interface section 360 is turned on/off by the power control section 340.

In the following, a description will be given of the operation of the radio communication system according to the first embodiment of the present invention with reference to FIGS. 2 to 5.

Having been activated, the radio terminal unit (110, 120) conducts negotiations with the radio base station 100. After the negotiations are concluded, no communication application is in execution on the radio terminal unit (110, 120). At this point, since "real-time processing unnecessary" is set as the default in the PS-Poll transmission timing memory 320, the radio terminal unit (110, 120) performs the ordinary power-saving operation, that is, the intermittent receiving operation at DTIM beacon intervals.

When a communication application is activated, the communication application section 300 informs the operation mode determination section 310 of the AP-ID, a number that uniquely identifies the communication application, and whether or not the communication application requires real-time processing ("real-time processing necessary" or "real-time processing unnecessary") as parameters. The AP-ID is uniquely assigned to each communication application.

After that, when the communication application actually enters into communication, the communication application section 300 informs the operation mode determination section 310 as to the start of communication. When informed as to a change in communication by the communication application section 300, the operation mode determination section 310 detects whether there is a communication application that requires real-time processing in all the communication applications which are currently running on the radio terminal unit (110, 120).

When even only one communication application that requires real-time processing has been detected, the operation mode determination section 310 determines that the radio terminal unit (110, 120) is in the real-time processing necessary state, and stores information, "real-time processing necessary", in the PS-Poll transmission timing memory 320. On the other hand, when there is no communication application that requires real-time processing, the operation mode determination section 310 determines that the radio terminal unit (110, 120) is in the real-time processing unnecessary state, and stores information, "real-time processing unnecessary", in the PS-Poll transmission timing memory 320.

The communication control section 350 instructs the timer control section 330 to start the timer when the real-time processing necessary state changes to the real-time processing unnecessary state. In contrast, the communication control section 350 instructs the timer control section 330 to stop the timer when the real-time processing unnecessary state changes to the real-time processing necessary state. When instructed to start timer control according to a transition to the real-time processing unnecessary state, the timer control section 330 provides the power control section 340 with a timer value based on the value which has been obtained from the operation mode determination section 310. Consequently, if the real-time processing necessary state changes to the real-time processing unnecessary state due to the start of communication by the communication application, the intermittent receiving interval of the radio terminal unit (110, 120) also changes.

Besides, when the established communication of a communication application is cut off, the communication application section 300 informs the operation mode determination section 310 as to the cutoff of communication. Having received the information about the cutoff of communication from the communication application section 300, the operation mode determination section 310 determines that communication has been cut off, and deletes the informed AP-ID corresponding to the communication application from the AP-IDs of active communication applications. After that, the operation mode determination section 310 checks whether real-time processing is necessary or unnecessary with respect to each of all the communication applications which are currently running on the radio terminal unit (110, 120).

After that, the radio terminal unit (110, 120) operates in the manner as previously set forth. That is, when even only one communication application that requires real-time processing has been detected, the operation mode determination section 310 determines that the radio terminal unit (110, 120) is in the real-time processing necessary state, and stores information, "real-time processing necessary", in the PS-Poll transmission timing memory 320. On the other hand, when there is no communication application that requires real-time processing, the operation mode determination section 310 determines that the radio terminal unit (110, 120) is in the real-time processing unnecessary state, and stores information, "real-time processing unnecessary", in the PS-Poll transmission timing memory 320.

In the case where the operation mode determination section 310 deletes all the AP-IDs of applications that have been in communication when informed on the cutoff of communication by the communication application section 300, only AP-ID "0" given as a default value remains behind. Thereby, it is determined that real-time processing is unnecessary, and, therefore, the radio terminal unit (110, 120) carries out the ordinary power-saving operation, that is, the intermittent receiving operation at DTIM beacon intervals in the same manner as when the negotiations with the radio base station 100 have been concluded.

Figure 5:
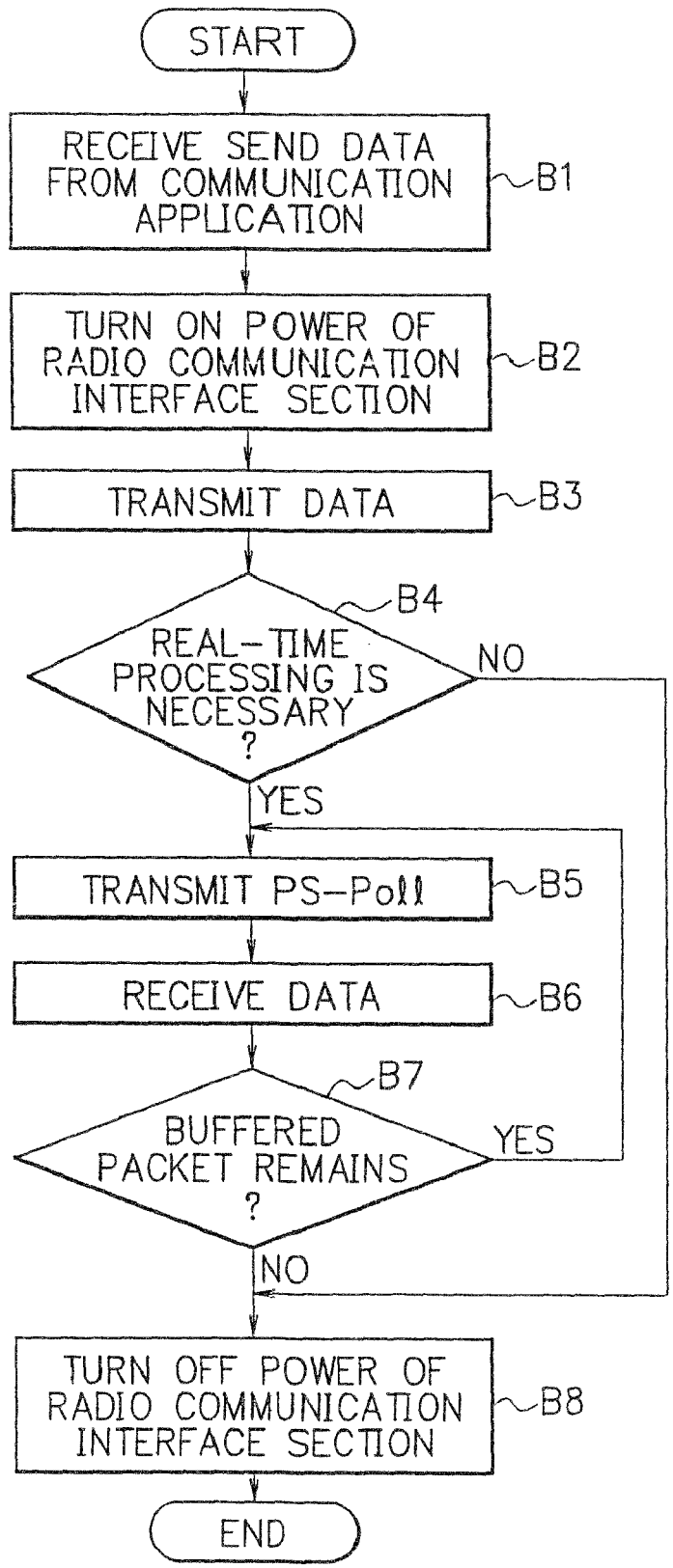
FIG. 5 is a flowchart for explaining part of the operation of a communication control section of the radio terminal unit depicted in FIG. 4.

FIG. 5 is a flowchart for explaining the operation of the radio terminal unit (110, 120) for transmitting data to the terminal unit 130 connected to a LAN or a WAN.

When the communication control section 350 receives send data addressed to the terminal unit 130 from the communication application section 300 (step B1), the section 350 sends a power on request to the power control section 340 in order to turn on the power of the radio communication interface section 360. Having received the power on request to turn on the power of the radio communication interface section 360, the power control section 340 turns on the power of the radio communication interface section 360 (step B2). After the power control section 340 turns on the power of the radio communication interface section 360, the radio communication interface section 360 is enabled for transmission and reception of data. When the radio communication interface section 360 has been enabled for transmission and reception of data, the communication control section 350 transmits the send data (step B3). The radio base station 100 acknowledges the receipt of the data by returning an acknowledge signal (ACK) to the radio terminal unit (110, 120). The transmission of the data is completed on receipt of the acknowledge signal (ACK).

Next, the communication control section 350 obtains information as to whether real-time processing is necessary or unnecessary stored in the PS-Poll transmission timing memory 320 (step B4).

When real-time processing is unnecessary (step B4, NO), the communication control section 350 sends a power off request to the power control section 340 in order to turn off the power of the radio communication interface section 360 (step B8).

On the other hand, when real-time processing is necessary (step B4, YES), the communication control section 350 transmits the PS-Poll to the radio base station 100 (step B5). The radio terminal unit (110, 120) receives an acknowledge signal (ACK) from the radio base station 100 in response to the PS-Poll. Subsequently, when the radio base station 100 has buffered packets to the radio terminal unit (110, 120), the terminal unit (110, 120) receives the buffered data (step B6). When the radio base station 100 has not buffered packets to the radio terminal unit (110, 120), the terminal unit (110, 120) receives NULL data.

In the case where the radio terminal unit (110, 120) receives the packets, the communication control section 350 determines whether or not buffered packets to the radio terminal unit (110, 120) remain in the radio base station 100 based on information contained in the received data (step B7). If buffered packets remain in the radio base station 100 (step B7, YES), the communication control section 350 retransmits the PS-Poll to the radio base station 100 (return to step B5). When there is no buffered packet left and the radio terminal unit (110, 120) receives NULL data (step B7, NO), the communication control section 350 sends a power off request to the power control section 340 in order to turn off the power of the radio communication interface section 360 (step B8).

In the following, a concrete example of the operation of the radio terminal units 110 and 120 will be described in detail referring to FIG. 2.

In FIG. 2, a "VoIP" application is active on each of the radio terminal units 110 and 120. The radio terminal units 110 and 120 have already concluded negotiations with the radio base station 100, and the base station 100 has been informed that the terminal units 110 and 120 are operating in power-saving mode.

As can be seen in FIG. 2, the radio base station 100 transmits beacons at regular intervals, and also transmits DTIM beacons at intervals of certain beacon intervals. After the negotiations, the radio base station 100 once buffers packets addressed to the radio terminal units 110 and 120 operating in power-saving mode in its memory. The radio base station 100 sends the buffered packets to the radio terminal units 110 and 120 upon receipt of transmission requests (PS-Poll) for requesting delivery of buffered packets from the respective terminal units 110 and 120.

The active application on each of the radio terminal units 110 and 120 requires real-time processing. It is assumed that the "VoIP" application that requires real-time processing is running on the radio terminal unit 110 and being in communication. When the communication application section 300 has assigned AP-ID "1" for the "VoIP" application and determined that real-time processing is necessary for the application, the operation mode determination section 310 determines that the radio terminal unit 110 is in the real-time processing necessary state, and stores information, "real-time processing necessary", in the PS-Poll transmission timing memory 320.

When send data is generated in the radio terminal unit 110, the power of the radio communication interface section 360 is turned on. Accordingly, the radio communication interface section 360 is enabled for transmission and reception of data. Thus, the radio terminal unit 110 transmits send data S1. Subsequently to the transmission of the send data S1, the radio terminal unit 110 transmits the PS-Poll (PS1) to the radio base station 100 since the terminal unit 110 is in the real-time processing necessary state. The radio base station 100 has received and buffered packets addressed to the radio terminal unit 110. Therefore, the radio base station 100 transmits a buffered packet P1 to the radio terminal unit 110 on receipt of the PS-Poll (PS1). The radio terminal unit 110 receives the packet P1. If there is no buffered packet left in the radio base station 100, the power of the radio communication interface section 360 is turned off, and the section 360 is disabled for transmission and reception of data.

When send data is continuously generated in the radio terminal unit 110, the power of the radio communication interface section 360 is turned on as above described to transmit send data S3. Subsequently to the transmission of the send data S3, the radio terminal unit 110 transmits the PS-Poll (PS3) to the radio base station 100 since the unit 110 is in the real-time processing necessary state. Thereby, the radio terminal unit 110 receives the packet P3 buffered by the radio base station 100. After the radio terminal unit 110 has received all packets buffered by the radio base station 100, the power of the radio communication interface section 360 is turned off in the manner as above described.

With regard to intervals between the generation of send data on the radio terminal unit 110, if the "VoIP" application which is running on the units 110 packetizes data, for example, at sampling intervals of 20 milli-seconds, send data are generated at intervals of 20 milli-seconds. Consequently, the radio terminal unit 110 carries out the intermittent receiving operation (receipt of packets by sending the PS-Polls) at intervals of 20 milli-seconds. As just described, according to the present invention, the radio terminal unit 110 performs the intermittent receiving operation independently of the beacon interval. Thus, it is possible to reduce delay in receiving packets or data from the radio base station 100.

On the other hand, when it has been determined that the radio terminal unit 110 is in the real-time processing unnecessary state, the power of the radio communication interface section 360 is turned off after the transmission of send data without transmitting the PS-Poll to the radio base station 100. The radio terminal unit 110 performs the intermittent receiving operation at DTIM beacon intervals.

In FIG. 2, the radio terminal unit 120 operates in the same manner as the radio terminal unit 110. If send data are generated in the radio terminal units 110 and 120 at similar intervals, it is hardly likely that the timing of generation of send data S1 in the terminal unit 110 is coincident with that of send data S2 in the terminal unit 120 since there is no dependency relation between the two as shown in FIG. 2.

In a conventional radio communication system, each radio terminal unit transmits the PS-Poll to a radio base station according to the receipt of a beacon. Consequently, it often happens that a plurality of radio terminal units transmit the PS-Polls to one radio base station all at once immediately after the receipt of a beacon, thereby causing collisions. However, according to the present invention, it is possible to reduce the rate of collisions, which often take place in the conventional system because of traffic congestion after the receipt of a beacon. Thus, delays can be reduced. Additionally, even when send data are generated in the plural radio terminal units at different intervals, respectively, it is also possible to reduce the rate of collisions which occur on the occasion of transmission. As a result, the effects of delays can be reduced.

While one communication application is active on the respective radio terminal units 110 and 120 in the first embodiment of the present invention, a plurality of communication applications may be running concurrently on the respective terminal units 110 and 120. In this case, the operation mode determination section 310 determines the operation mode of the radio terminal unit based on the operation mode of the communication applications, and the radio terminal unit operates or requests for packet delivery based on the operation mode. Consequently, even when a plurality of radio terminal units are connected to the same radio base station, the radio terminal units can perform the intermittent receiving operation differently from each other according to the operation mode of one or more communication applications which are running on the respective terminal units.

In the following, a description will be made of the second embodiment of the present invention.

A radio terminal unit according to the second embodiment is in many respects basically similar to that of the first embodiment shown in FIG. 4 except for the operation of the communication application section 300 and the communication control section 350.

When a communication application is activated and send data is generated, the communication application section 300 sends the data to the communication control section 350. At the same time, the communication application section 300 of the second embodiment provides the communication control section 350 with information as to whether real-time processing is necessary or unnecessary as attached information to the send data differently from that of the first embodiment. On this occasion, the communication application section 300 determines whether real-time processing is necessary or unnecessary. For example, when send data is generated by a communication application that requires real-time processing such as a VoIP application, the communication application section 300 sends the data to the communication control section 350 with information, "real-time processing necessary". On the other hand, when send data is generated by a communication application that does not require real-time processing such as a web browser application, the communication application section 300 sends the data to the communication control section 350 with information "real-time processing unnecessary".

The communication control section 350 operates essentially in the same manner as that of the first embodiment except as set forth below. That is, in the first embodiment, the communication control section 350 determines whether or not to transmit the PS-Poll with reference to information from the PS-Poll transmission timing memory 320 after transmitting send data received from the communication application section 300. On the other hand, in the second embodiment, the communication control section 350 is provided with information as to whether or not to transmit the PS-Poll together with send data by the communication application section 300, and determines whether or not to transmit the PS-Poll based on the information after transmitting the send data.

Figure 6:
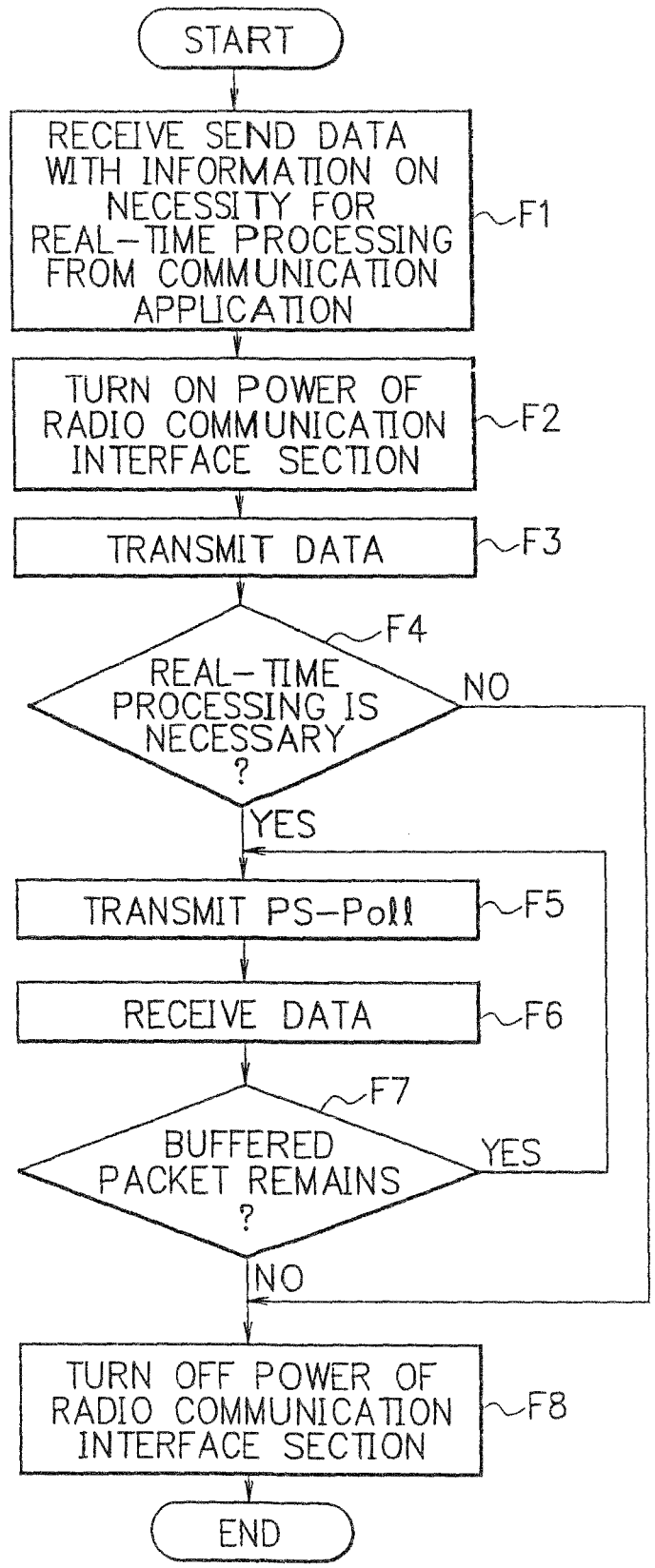
FIG. 6 is a flowchart for explaining part of the operation of a communication control section according to the second embodiment of the present invention.

In the following, the operation of the radio terminal unit (110, 120) for transmitting data to the terminal unit 130 in the second embodiment will be described in detail referring to FIG. 6. FIG. 6 is a flowchart for explaining part of the operation of the communication control section 350 according to the second embodiment of the present invention.

When send data is generated, the communication application section 300 feeds the communication control section 350 with information as to whether real-time processing is necessary or unnecessary in addition to the send data (step F1).

When the communication control section 350 receives the send data addressed to the terminal unit 130 from the communication application section 300, the section 350 sends a power on request to the power control section 340 in order to turn on the power of the radio communication interface section 360. Having received the power on request to turn on the power of the radio communication interface section 360, the power control section 340 turns on the power of the radio communication interface section 360 (step F2). After the power control section 340 turns on the power of the radio communication interface section 360, the radio communication interface section 360 is enabled for transmission and reception of data. When the radio communication interface section 360 has been enabled for transmission and reception of data, the communication control section 350 transmits the send data (step F3). The radio base station 100 acknowledges the receipt of the data by returning an acknowledge signal (ACK) to the radio terminal unit (110, 120). The transmission of the data is completed on receipt of the acknowledge signal (ACK).

Next, the communication control section 350 determines whether real-time processing is necessary or unnecessary based on the information as to whether real-time processing is necessary or unnecessary received from the communication application section 300 (step F4).

When real-time processing is unnecessary (step F4, NO), the communication control section 350 sends a power off request to the power control section 340 in order to turn off the power of the radio communication interface section 360 (step F8).

On the other hand, when real-time processing is necessary (step F4, YES), the communication control section 350 transmits the PS-Poll to the radio base station 100 (step F5). The radio terminal unit (110, 120) receives an acknowledge signal (ACK) from the radio base station 100 in response to the PS-Poll. Subsequently, when the radio base station 100 has buffered packets to the radio terminal unit (110, 120), the unit (110, 120) receives the buffered data (step F6). When the radio base station 100 has not buffered packets to the radio terminal unit (110, 120), the terminal unit (110, 120) receives NULL data.

In the case where the radio terminal unit (110, 120) receives the buffered packets, the communication control section 350 determines whether or not buffered packets to the radio terminal unit (110, 120) remain in the radio base station 100 based on information contained in the received data (step F7). If buffered packets remain in the radio base station 100 (step F7, YES), the communication control section 350 retransmits the PS-Poll to the radio base station 100 (return to step F5). When there is no buffered packet left and the radio terminal unit (110, 120) receives NULL data (step F7, NO), the communication control section 350 sends a power off request to the power control section 340 in order to turn off the power of the radio communication interface section 360 (step F8).

As described above, the second embodiment of the present invention is different from the first embodiment in that the communication application section 300 provides the communication control section 350 with information as to whether real-time processing is necessary or unnecessary as attached information to send data when sending the data to the section 350. More specifically, in the first embodiment, in the case where communication applications, which differ from one another in the necessity for real-time processing (e.g. a web browser application that does not require real-time processing and a VoIP application that requires real-time processing), are concurrently running on the radio terminal unit and real-time processing is necessary, the communication control section transmits the PS-Poll after transmission of send data without identifying the communication application which has sent the data to the communication control section. However, in accordance with the second embodiment, the communication control section transmits the PS-Poll only after transmitting send data from a communication application that requires real-time processing. Consequently, unnecessary transmission of the PS-Poll can be prevented, thereby enabling a more reduction in operating time. As a result, the radio terminal unit is usable for a longer period of time.

In the following, a description will be made of the third embodiment of the present invention.

A radio terminal unit according to the third embodiment is in many respects basically similar to that of the first embodiment shown in FIG. 4 except for the operation of the operation mode determination section 310 and the communication control section 350.

The operation mode determination section 310 of the third embodiment is informed of a changeover in communication applications being in communication by the communication application section 300, and informs the communication control section 350 about the changeover differently from that of the first embodiment. In addition, the operation mode determination section 310 keeps the intermittent receiving interval for the occasion when real-time processing is required. The intermittent receiving interval is utilized by the timer control section 330.

The communication control section 350 exercises control to transmit data from the communication application section 300 through the radio communication interface section 360, and to send data received through the radio communication interface section 360 to the communication application section 300. On receipt of send data from the communication application section 300, the communication control section 350 sends a power on request to the power control section 340 in order to turn on the power of the radio communication interface section 360. The communication control section 350 sends all data received from the communication application section 300. Those processes are performed as in the first embodiment.

However, in the third embodiment, the communication control section 350 sends a power off request to the power control section 340 in order to turn off the power of the radio communication interface section 360 after transmitting all send data. Having informed of a changeover in applications being in communication by the operation mode determination section 310, the communication control section 350 obtains information, "real-time processing necessary" or "real-time processing unnecessary" from the PS-Poll transmission timing memory 320. The communication control section 350 performs the following processes based on the obtained information.

When there is no transition from the real-time processing necessary to unnecessary state and vice versa, the communication control section 350 stays the same. Besides, when there is a transition from the real-time processing unnecessary to necessary state, the communication control section 350 controls the timer control section 330 so as to provide the power control section 340 with a timer value unrelated to the beacon interval based on a value obtained from the operation mode determination section 310. On the other hand, when there is a transition from the real-time processing necessary to unnecessary state, the communication control section 350 controls the timer control section 330 so as to provide the power control section 340 with a timer value in synchronism with the beacon interval based on a value obtained from the operation mode determination section 310.

Figure 7:
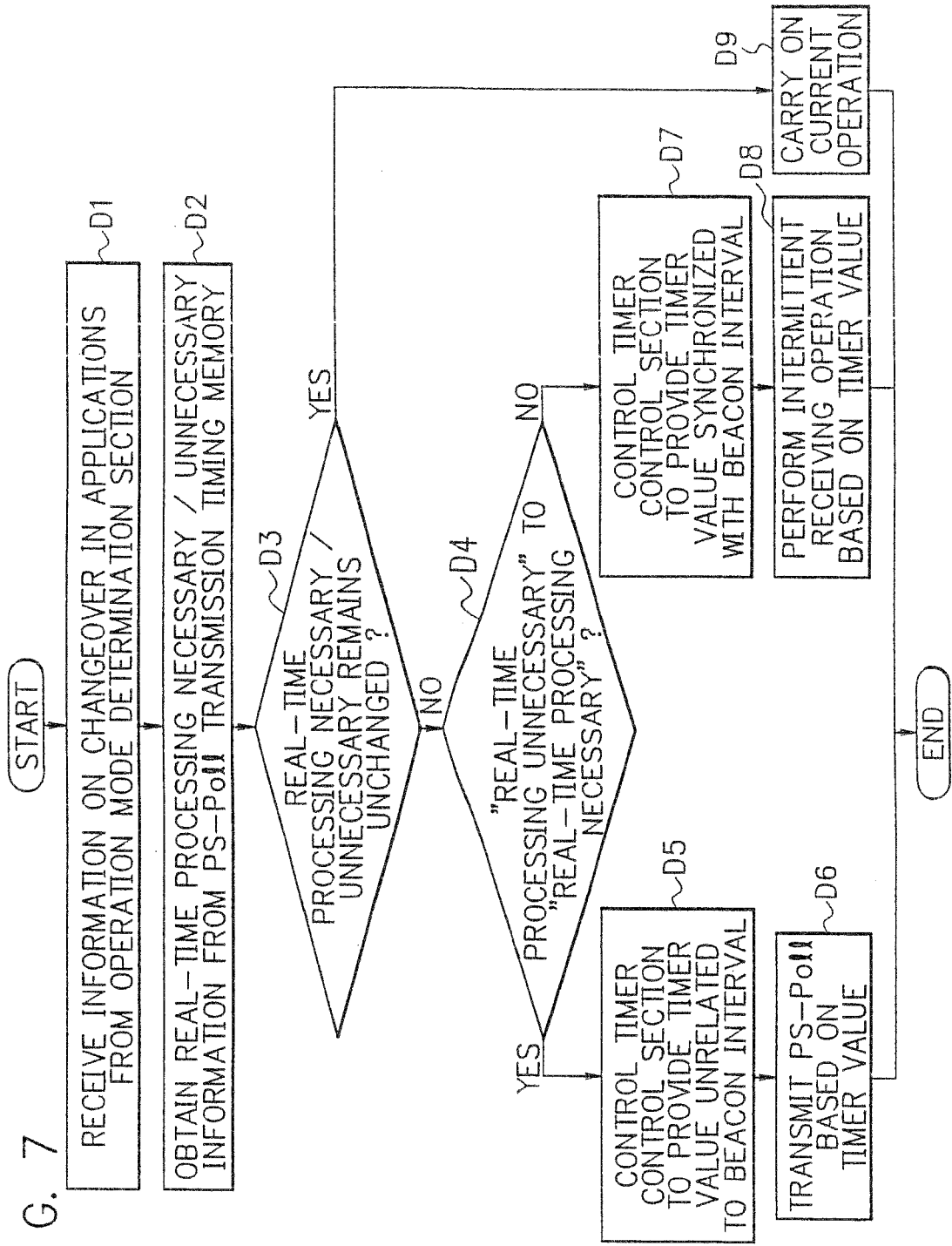
FIG. 7 is a flowchart for explaining part of the operation of a communication control section according to the third embodiment of the present invention.

In the following, the operation of the radio terminal unit in the third embodiment will be described in detail referring to FIG. 7. FIG. 7 is a flowchart for explaining part of the operation of the communication control section 350 according to the third embodiment of the present invention.

First, the operation mode determination section 310 is informed of a changeover in communication applications being in communication by the communication application section 300, and informs the communication control section 350 about the changeover in applications being in communication (step D1).

Having informed of the changeover in applications being in communication by the operation mode determination section 310, the communication control section 350 obtains information, "real-time processing necessary" or "real-time processing unnecessary" from the PS-Poll transmission timing memory 320 (step D2). The communication control section 350 operates differently depending on the obtained information.

When there is no transition from the real-time processing necessary to unnecessary state and vice versa (step D3, YES), the communication control section 350 carries on current operation (step D9).

When there is a transition (step D3, NO) from the real-time processing unnecessary to necessary state (step D4, YES), the communication control section 350 instructs the timer control section 330 to provide the communication control section 350 with a timer value unrelated to the beacon interval based on a value obtained from the operation mode determination section 310 (step D5). After that, the communication control section 350 sends a power on request to the power control section 340 in synchronism with the timer value obtained from the timer control section 330 to turn on the power of the radio communication interface section 360 so that the radio communication interface section 360 is enabled for transmission and reception of data. Thus, the communication control section 350 repeatedly transmits the PS-Poll to the radio base station (step D6). The operation of the communication control section 350 in this instance is to be more fully described hereinafter.

On the other hand, when there is a transition from the real-time processing necessary to unnecessary state (step D4, NO), the communication control section 350 instructs the timer control section 330 to provide the communication control section 350 with a timer value in synchronism with the DTIM beacon interval based on a value obtained from the operation mode determination section 310 (step D7). After that, the communication control section 350 sends a power on request to the power control section 340 in synchronism with the timer value obtained from the timer control section 330 to turn on the power of the radio communication interface section 360 so that the radio communication interface section 360 is enabled for transmission and reception of data. Thus, the communication control section 350 performs the intermittent receiving operation based on the receipt of the DTIM beacon (step D8).

Figure 8:
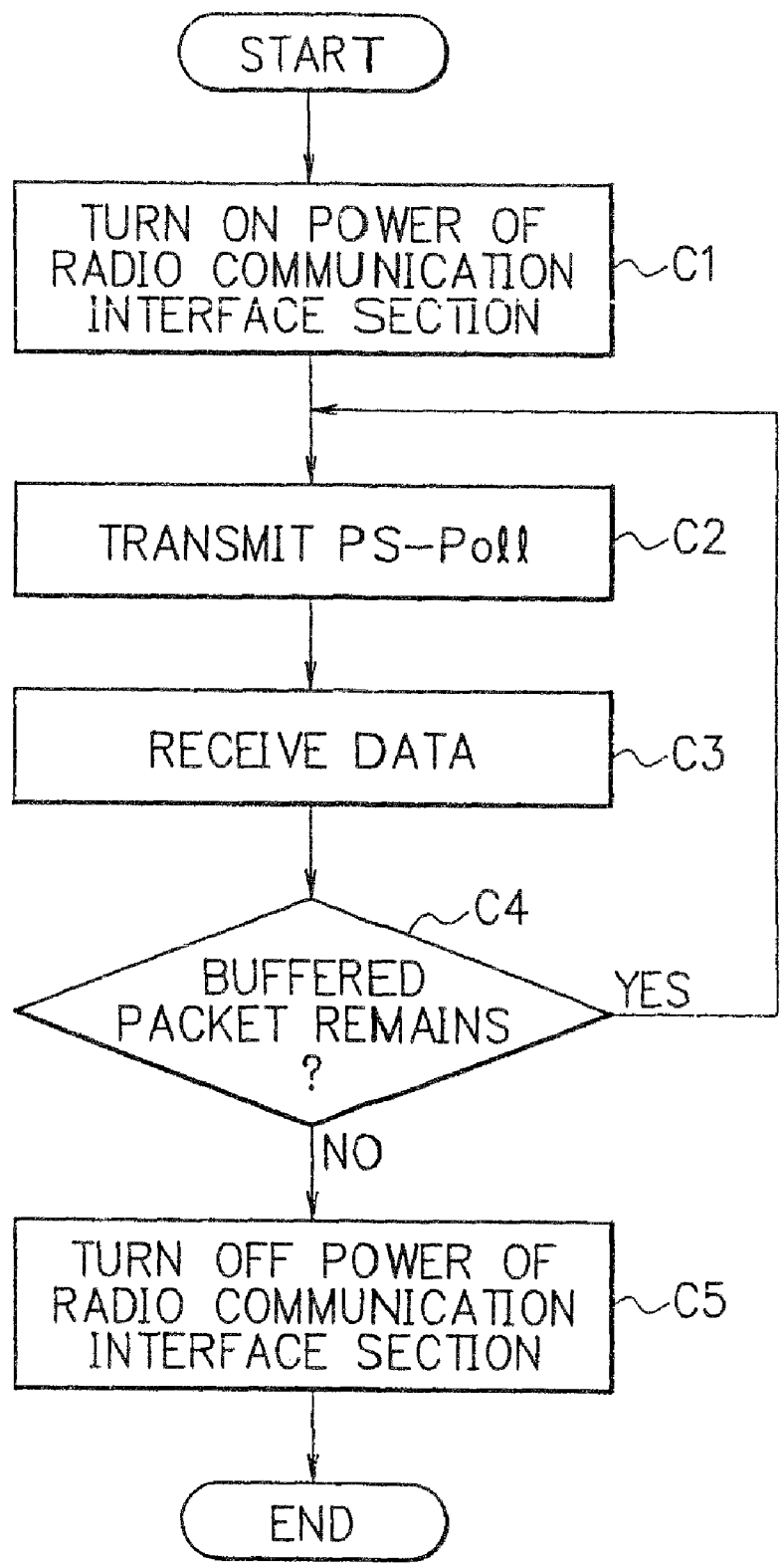
FIG. 8 is a flowchart for explaining the operation of the communication control section when there is a request for real-time processing according to the third embodiment of the present invention.

FIG. 8 is a flowchart for explaining the operation of the communication control section 350 when real-time processing is necessary according to the third embodiment of the present invention.

When real-time processing is necessary, or when there is a transition from the real-time processing unnecessary to necessary state, the communication control section 350 sends a power on request to the power control section 340 based on the timer value obtained from the timer control section 330 to turn on the power of the radio communication interface section 360 so that the radio communication interface section 360 is enabled for transmission and reception of data (step C1). Next, the communication control section 350 transmits the PS-Poll to the radio base station (step C2). The radio terminal unit receives an acknowledge signal (ACK) from the radio base station in response to the PS-Poll. Subsequently, when the radio base station has buffered packets to the radio terminal unit, the terminal unit receives the buffered data (step C3). When the radio base station has not buffered packets to the radio terminal unit, the terminal unit receives NULL data.

In the case where the radio terminal unit receives the packets, the communication control section 350 determines whether or not buffered packets to the radio terminal unit remain in the radio base station based on information contained in the received data (step C4). If buffered packets remain in the radio base station (step C4, YES), the communication control section 350 retransmits the PS-Poll to the radio base station (return to step C2). When there is no buffered packet left and the radio terminal unit receives NULL data (step C4, NO), the communication control section 350 sends a power off request to the power control section 340 in order to turn off the power of the radio communication interface section 360 (step C5).

On the other hand, when real-time processing is unnecessary, or when there is a transition from the real-time processing necessary to unnecessary state, the communication control section 350 performs the intermittent receiving operation based on the DTIM beacon interval as in the first embodiment.

As described above, in accordance with the third embodiment of the present invention, when real-time processing is necessary, the timing of transmission of the PS-Poll is determined independently of both the timing of transmission of send data and the beacon interval differently from the first embodiment. Namely, the PS-Poll is spontaneously transmitted from the radio terminal unit to the radio base station at intervals corresponding to communication applications. Therefore, even in asymmetrical communication, such as broadcast, multicast and simultaneous transmissive communication, that requires real-time processing, it is possible to reduce the rate of collisions, which often take place when the timing of transmission of the PS-Poll is determined based on the beacon interval because a plurality of radio terminal units transmit the PS-Polls to one radio base station all at once immediately after the receipt of a beacon. Thus, delay in receiving packets from the radio base station can be reduced, and the quality of communication can be improved.

While, in the third embodiment, the operation mode determination section 310 have the values for determining the timer value ready beforehand, the communication application section 300 may provide the operation mode determination section 310 with the values.

Additionally, the third embodiment of the present invention may be applicable in combination with the first and/or second embodiment.

In the following, a description will be made of the fourth embodiment of the present invention.

Figure 9:
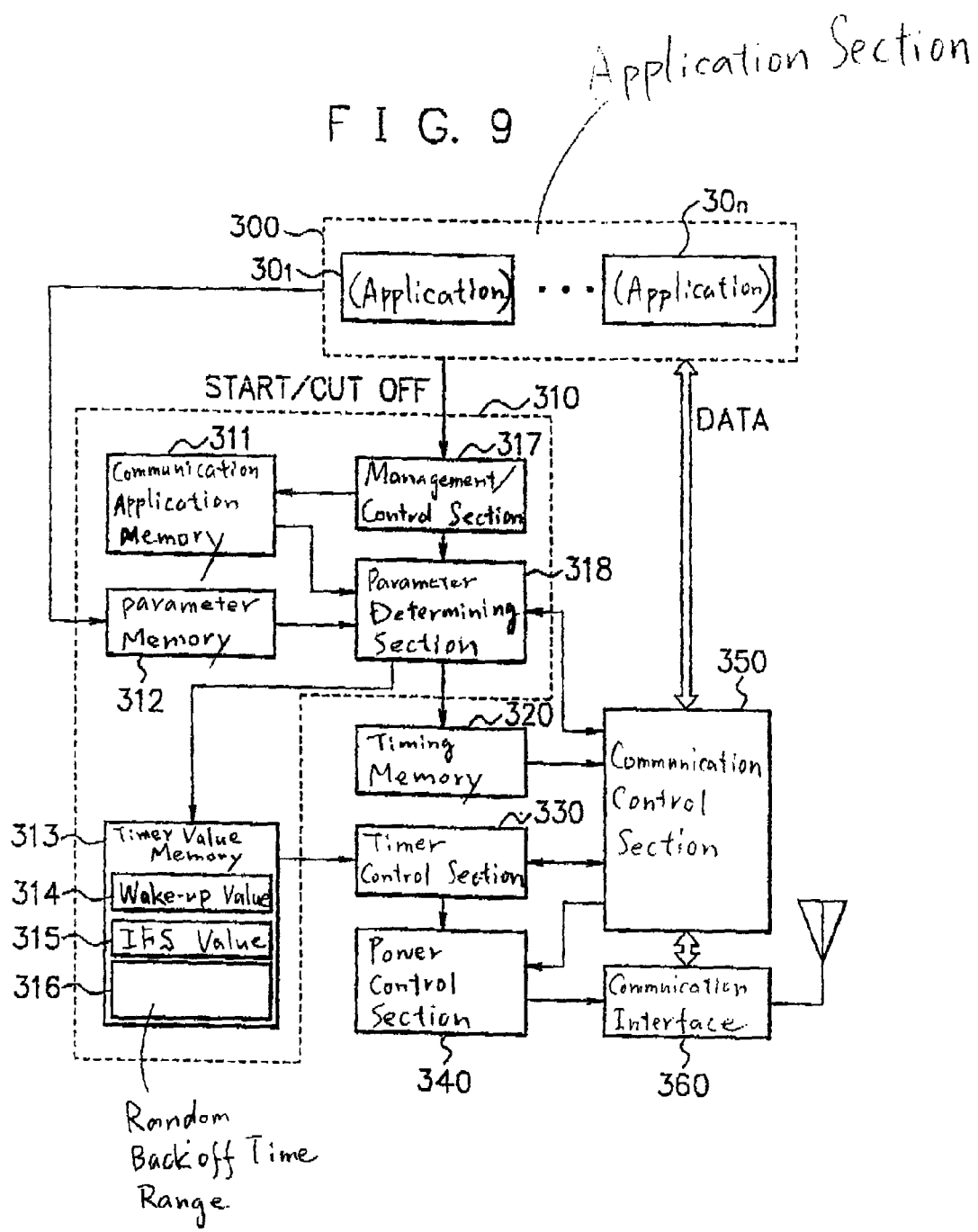
FIG. 9 is a block diagram showing the configuration of a radio terminal unit according to the fourth embodiment of the present invention.

FIG. 9 is a block diagram showing the configuration of a radio terminal unit according to the fourth embodiment of the present invention. The radio terminal unit shown in FIG. 9 is in many respects basically similar to that of the first embodiment shown in FIG. 4 except for the configuration of the operation mode determination section 310, and similar numbers are utilized in designating corresponding portions of the unit. As can be seen in FIG. 9, the operation mode determination section 310 has more elaborate configuration as compared to that of the first embodiment.

The operation mode determination section 310 comprises a communicating application memory 311, a parameter memory 312, a timer value memory 313, an application communication management/control section 317, and a parameter determining section 318.

When a communication application is activated, the communication application section 300 sets necessary parameters for the application in the parameter memory 312. When a communication application is deactivated, the communication application section 300 deletes the parameters set on startup for the application from the parameter memory 312. In addition, the communication application section 300 informs the application communication management/control section 317 as to the start and cutoff of communication differently from the first embodiment.

The communicating application memory 311 stores applications currently being in communication by values that uniquely identify them. Those values are set by the application communication management/control section 317.

FIG. 10 is a diagram showing examples of the contents of the communicating application memory 311 and the parameter memory 312. In FIG. 10, for example, AP-ID "0" (401) is preset as a default value to indicate that no communication application is being executed, and stored in the communicating application memory 311. The communicating application memory 311 keeps therein that applications with AP-ID "1" (402) and AP-ID "2" (404) are currently communicating.

The parameter memory 312 stores information as to whether real-time processing is necessary or unnecessary with respect to each active communication application. The information, "real-time processing necessary" or "real-time processing unnecessary" is set by the communication application section 300. As shown in FIG. 10, when the AP-ID is "0" (411), "real-time processing unnecessary" is set and stored in the parameter memory 312 beforehand.

Besides, the parameter memory 312 stores the power-saving rate corresponding to each active communication application. The percentage is set by the communication application section 300. As shown in FIG. 10, when the AP-ID is "0" (411), the power-saving rate is set at 100%, which is previously stored in the parameter memory 312. That is, in the case where no application is active, the radio terminal unit of the fourth embodiment carries out the intermittent receiving operation at DTIM beacon intervals.

In addition, the parameter memory 312 stores a priority for each active communication application. The priority is set by the communication application section 300. As shown in FIG. 10, when the AP-ID is "0" (411), "low" priority is set and stored in the parameter memory 312 beforehand. In other words, when no application is active, the radio terminal unit of the fourth embodiment carries out the operation at the level of "low" priority.

The contents of the timer value memory 313 include a wake-up timer value 314, an IFS (Inter Frame Space) timer value 315 and a random back off time range 316. The wake-up timer value 314, the IFS (Inter Frame Space) timer value 315 and the random back off time range 316 are determined and set by the parameter determining section 318. The parameter determining section 318 previously set the wake-up timer value 314 based on the DTIM beacon interval obtained by receiving a beacon after the completion of negotiations with the radio base station. The IFS timer value 315 and the random back off time range 316 stored in the timer value memory 313 are used when the radio terminal unit actually transmits the PS-Poll or data to the radio base station. The parameter determining section 318 sets the IFS timer value 315 based on a DIFS (Distributed Inter Frame Space) value.

The application communication management/control section 317 is informed as to the AP-ID and the start and cutoff of communication by the communication application section 300. At the start of communication, the application communication management/control section 317 adds the AP-ID of an application has entered into communication into the communicating application memory 311. On the other hand, when communication is cut off, the application communication management/control section 317 deletes the AP-ID from the communicating application memory 311. Additionally, the application communication management/control section 317 informs the parameter determining section 318 about a changeover in communication applications being in communication.

Having been informed about a changeover in communication applications being in communication by the application communication management/control section 317, the parameter determining section 318 obtains the AP-IDs of applications currently being in communication from the communicating application memory 311 to recognize the applications being in communication. The parameter determining section 318 obtains the information as to whether real-time processing is necessary or unnecessary with respect to each communication application being in communication from the parameter memory 312. When even only one communication application that requires real-time processing is present, the parameter determining section 318 stores information, "real-time processing necessary", in the PS-Poll transmission timing memory 320. On the other hand, when there is no communication application that requires real-time processing, the parameter determining section 318 stores information, "real-time processing unnecessary", in the PS-Poll transmission timing memory 320.

Besides, the parameter determining section 318 obtains the power-saving rates for applications being in communication from the parameter memory 312. Subsequently, the parameter determining section 318 finds out the intermittent receiving interval for the radio terminal unit according to the lowest power-saving rate of the obtained power-saving rates using the DTIM beacon interval and the beacon interval (TIM beacon interval) fed by the communication control section 350. After that, the parameter determining section 318 sets the intermittent receiving interval as the wake-up timer value 314 in the timer value memory 313.

At the same time, the parameter determining section 318 obtains the priorities for applications being in communication from the parameter memory 312, and finds out the highest priority of the obtained priorities. Based on the highest priority, the parameter determining section 318 determines the IFS timer value 315 and the random back off time range 316 used when the radio terminal unit actually transmits the PS-Poll or data to the radio base station. The parameter determining section 318 sets the IFS timer value 315 and the random back off time range 316 in the timer value memory 313.

The PS-Poll transmission timing memory 320 stores the timing of transmission of the PS-Poll corresponding to the active communication applications. The transmission timing is utilized by the communication control section 350. The parameter determining section 318 determines and sets this value in the PS-Poll transmission timing memory 320.

The timer control section 330 operates when there is no active communication application that requires real-time processing in the communication application section 300. The timer control section 330 obtains the intermittent receiving interval from the wake-up timer value 314, and continues to provide the power control section 340 with a timer value at intervals (at intervals of one or more beacon intervals) corresponding to the wake-up timer value 314. The timer control section 330 starts providing the timer value on the basis of the receipt of a beacon with the DTIM. Additionally, the timer control section 330 corrects the timer value according to the beacon receiving timing obtained from the communication control section 350. The communication control section 350 informs the timer control section 330 as to a transition from real-time processing unnecessary to necessary state and vice versa. That is, the timer control section 330 starts or stops operating as a timer under the control of the communication control section 350.

In the following, a description will be given of the operation of the radio communication system according to the fourth embodiment of the present invention with reference to FIGS. 9 to 11.

Having been activated, the radio terminal unit (110, 120) conducts negotiations with the radio base station 100. After the negotiations are concluded, no communication application is in execution on the radio terminal unit (110, 120). At this point, since "real-time processing unnecessary" is set as the default in the PS-Poll transmission timing memory 320, the radio terminal unit (110, 120) performs the ordinary power-saving operation, that is, the intermittent receiving operation at DTIM beacon intervals.

FIG. 11 is a flowchart for explaining the operation of the radio terminal unit (110, 120) for determining whether real-time processing is necessary or unnecessary based on communication applications in execution on the terminal unit (110, 120).

When a communication application is activated, the communication application section 300 stores the AP-ID of the application and the information as to whether or not the application requires real-time processing in the parameter memory 312. The AP-ID is uniquely assigned to each communication application. For example, AP-ID "1" is assigned to the activated communication application. At the same time, the power-saving rate and priority for the communication application is stored in the parameter memory 312. In the example of FIG. 10, such information as "real-time processing necessary", a power-saving rate of "10%" and "low priority" is stored in relation to AP-ID "1" (412) in the parameter memory 312.

After that, when the communication application actually enters into communication in the communication application section 300, the application communication management/control section 317 is informed as to the start of communication. More specifically, the application communication management/control section 317 is informed that, for example, the communication application with AP-ID "1" has entered into communication.

When informed as to the start of communication by the communication application section 300, the application communication management/control section 317 determines that communication has been started (FIG. 11, step A1, START), and, as shown in FIG. 10, adds the informed AP-ID, for example, AP-ID "1" (402) into the communicating application memory 311 (step A2). Having added the AP-ID into the communicating application memory 311, the application communication management/control section 317 informs the parameter determining section 318 that a changeover has been made in communication.

When receiving the information about the changeover in communication from the application communication management/control section 317, the parameter determining section 318 searches the communicating application memory 311 for applications currently being in communication, and obtains the AP-IDs of the applications (step A3). Next, the parameter determining section 318 searches the parameter memory 312 to obtain information as to whether real-time processing is necessary or unnecessary corresponding to the respective AP-IDs of all the communication applications (step A4). In the example of FIG. 10, if the obtained AP-IDs of the applications being in communication are "0" (411), "1" (412) and "3" (414), the obtained information for the respective AP-IDs "0", "1" and "3" is "real-time processing unnecessary", "real-time processing necessary" and "real-time processing unnecessary".

When even only one communication application that requires real-time processing is present, the parameter determining section 318 determines that the radio terminal unit (110, 120) is in the real-time processing necessary state (step A5), and stores information, "real-time processing necessary", in the PS-Poll transmission timing memory 320 (step A6). In the above case, the parameter determining section 318 determines that the radio terminal unit (110, 120) is in the real-time processing necessary state, and stores information, "real-time processing necessary", in the PS-Poll transmission timing memory 320 since information, "real-time processing unnecessary", "real-time processing necessary" and "real-time processing unnecessary", has been obtained for the respective AP-IDs "0", "1" and "3".

When receiving the information about the changeover in communication from the application communication management/control section 317, the parameter determining section 318 searches the communicating application memory 311 for applications currently being in communication, and obtains the AP-IDs of the applications as described previously. After that, the parameter determining section 318 also obtains power-saving rates in relation to the respective AP-IDs of all the communication applications from the parameter memory 312. In the example of FIG. 10, if the obtained AP-IDs of the applications being in communication are "0" (411), "1" (412) and "3" (414), power-saving rates "100%", "10%" and "100%" are obtained for the AP-IDs "0", "1" and "3", respectively.

Subsequently, the parameter determining section 318 selects the lowest power-saving rate from the obtained power-saving rates. Then, the parameter determining section 318 finds out the intermittent receiving interval based on the lowest power-saving rate. One approach to finding out the intermittent receiving interval involves following processes. First, the parameter determining section 318 finds out divisors of the DTIM interval. Then, the parameter determining section 318 divides the percentage (100%) equally by the number of the divisors, and uses a divisor corresponding to the lowest power-saving rate as the intermittent receiving interval. For example, if the DTIM interval is "8", there are four divisors, "1", "2", "4" and "8". Therefore, when divided equally among the divisors "1", "2", "4" and "8", the percentage (100%) is divided into four parts, that is, from 0% to 25% for "1", from 26% to 50% for "2", from 51% to 75% for "4" and from 76% to 100% for "8". In the above case, the parameter determining section 318 decides on "1" as the intermittent receiving interval since the lowest power-saving rate of the obtained power-saving rates is 10%. Thus, the parameter determining section 318 determines the intermittent receiving interval, and stores the determined value in the timer value memory 313 as the wake-up timer value 314.

The communication control section 350 instructs the timer control section 330 to start the timer when the real-time processing necessary state changes to the real-time processing unnecessary state. In contrast, the communication control section 350 instructs the timer control section 330 to stop the timer when the real-time processing unnecessary state changes to the real-time processing necessary state. When instructed to start timer control according to a transition to the real-time processing unnecessary state, the timer control section 330 continuously multiplies the beacon interval based on the wake-up timer value 314 stored in the timer value memory 313, and provides the power control section 340 with a timer value on the basis of the product. Consequently, when the wake-up timer value 314 changes due to the start of communication by a communication application, the intermittent receiving interval for the radio terminal unit (110, 120) in the real-time processing unnecessary state also changes.

When receiving the information about the changeover in communication from the application communication management/control section 317, the parameter determining section 318 searches the communicating application memory 311 for applications currently being in communication, and obtains the AP-IDs of the applications as described previously. After that, the parameter determining section 318 also obtains priorities in relation to the respective AP-IDs of all the communication applications from the parameter memory 312. In the example of FIG. 10, if the obtained AP-IDs of the applications being in communication are "0" (411), "1" (412) and "3" (414), "low", "high" and "middle" priorities are obtained for the AP-IDs "0,", "1" and "3", respectively.

Subsequently, the parameter determining section 318 selects the highest priority from the obtained priorities. Then, the parameter determining section 318 determines the IFS timer value and the range of random back off time based on the highest priority. The IFS timer value and the random back off time range may be determined in the following manner. The parameter determining section 318 sets the IFS timer value using the DIFS. For example, in the case of "high" priority, the parameter determining section 318 sets the IFS timer value to DIFS-2t. In the case of "middle" priority, the IFS timer value is set to DIFS-t. In the case of "low" priority, the IFS timer value is set to DIFS (t: arbitrarily value).

Besides, assuming that the maximum value of normal random back off time is R, the parameter determining section 318 sets the random back off time range, for example, to 0 to 0.5 R in the case of "high" priority. In the case of "middle" priority, the random back off time range is set to 0 to 0.75 R. In the case of "low" priority, the random back off time range is set to 0 to R. In the above case, the parameter determining section 318 determines that the IFS timer value is "DIFS-2t", and that the random back off time range is the narrowest range of "0 to 0.5 R" since the highest priority of the obtained priorities is "high" priority. Thus, the parameter determining section 318 determines the IFS timer value and the range of random back off time, and stores the determined values in the timer value memory 313 as the IFS timer value 315 and the random back off time range 316.

When required by the communication control section 350, the timer control section 330 continuously provides the power control section 340 with a timer value on the basis of the IFS timer value 315 and the random back off time range 316. Consequently, when the IFS timer value 315 and the random back off time range 316 change due to the start of communication by a communication application, the timer value used when the radio terminal unit (110, 120) transmits data or the PS-Poll also change.

On the other hand, when the established communication of a communication application is cut off, the communication application section 300 informs the application communication management/control section 317 as to the cutoff of communication. Having received the information about the cutoff of communication from the communication application section 300, the application communication management/control section 317 determines that communication has been cut off (step A1, CUTOFF), and deletes the AP-ID corresponding to the informed communication application from the communicating application memory 311 (step A7).

After deleting the corresponding AP-ID from the communicating application memory 311, the application communication management/control section 317 informs the parameter determining section 318 that a changeover has been made in communication. After that, the operation proceeds to step A3, and the aforementioned processes are performed.

In the case where the application communication management/control section 317 deletes all the AP-IDs of applications that have been in communication from the communicating application memory 311 at step A7, only AP-ID "0" given as a default value remains behind. Thereby, it is determined that real-time processing is unnecessary since there is no application being in communication. Consequently, the radio terminal unit (110, 120) performs the ordinary power-saving operation, that is, the intermittent receiving operation at DTIM beacon intervals. Besides, the communication control section 350 carries out the transmitting operation using the normal DIFS value and random back off time range.

In the fourth embodiment, the radio terminal unit (110, 120) transmits data to another terminal unit 130 in the same manner as the radio terminal unit (110, 120) of the first embodiment described previously in connection with FIG. 5.

As is described above, according to the fourth embodiment of the present invention, the timer value memory 313 stores the IFS timer value 315 and the random back off time range 316 used when transmitting data or the PS-Poll. Consequently, priorities can be set according to applications being in communication. Thus, in real-time communication such as voice communication, the effects of delays can be reduced.

In the following, a description will be made of the fifth embodiment of the present invention.

The radio terminal unit of the fifth embodiment is of the same configuration as that of the fourth embodiment shown in FIG. 9, however, operates differently as in the case of the first and third embodiments. That is, the fifth embodiment differs from the fourth embodiment in the operation of the parameter determining section 318, the timer control section 330 and the communication control section 350.

The parameter determining section 318 of the fifth embodiment is different from that of the fourth embodiment in that, when informed of a changeover in communication applications being in communication by the application communication management/control section 317, the parameter determining section 318 informs the communication control section 350 about the changeover.

Besides, the timer control section 330 of the fifth embodiment is different from that of the fourth embodiment in that the section 330 provides the communication control section 350 with a timer value synchronized with the beacon interval or a timer value unrelated to the beacon interval based on the wake-up timer value 314 by request from the communication control section 350. In other words, the timer control section 330 makes a switch between the two values by request from the communication control section 350.

The communication control section 350 exercises control to transmit data from the communication application section 300 through the radio communication interface section 360, and to send data received through the radio communication interface section 360 to the communication application section 300. In addition, the communication control section 350 conducts the negotiations with the radio base station 100. On receipt of send data from the communication application section 300, the communication control section 350 sends a power on request to the power control section 340 in order to turn on the power of the radio communication interface section 360. The communication control section 350 sends all data received from the communication application section 300. Those processes are performed as in the fourth embodiment.

However, in the fifth embodiment, the communication control section 350 sends a power off request to the power control section 340 in order to turn off the power of the radio communication interface section 360 after transmitting all send data. Having informed of a changeover in applications being in communication by the parameter determining section 318, the communication control section 350 obtains information, "real-time processing necessary" or "real-time processing unnecessary" from the PS-Poll transmission timing memory 320.

When there is a transition from the real-time processing unnecessary to necessary state, the communication control section 350 controls the timer control section 330 so as to provide the power control section 340 with a timer value unrelated to the beacon interval based on the wake-up timer value 314. On the other hand, when there is a transition from the real-time processing necessary to unnecessary state, the communication control section 350 controls the timer control section 330 so as to provide the power control section 340 with a timer value in synchronism with the beacon interval based on the wake-up timer value 314. That is, the communication control section 350 of the fifth embodiment operates in the same manner as that of the third embodiment.

In the following, a description will be given of the operation of the radio terminal unit according to the fifth embodiment of the present invention. The fifth embodiment is basically similar to the fourth embodiment except for the operation of the parameter determining section 318, the timer control section 330 and the communication control section 350.

The parameter determining section 318 determines information to be stored in the PS-Poll transmission timing memory 320 and respective values to be stored in the timer value memory 313 in the same manner as described previously for the fourth embodiment. As mentioned above, in this embodiment, the communication control section 350 operates similarly to that of the third embodiment.

According to the fifth embodiment of the present invention, the timer value memory 313 stores the IFS timer value 315 and the random back off time range 316 used when transmitting data or the PS-Poll as in the fourth embodiment. Consequently, priorities can be set according to applications being in communication. Thus, in real-time communication such as voice communication, the effects of delays can be reduced.

As described above, in accordance with the fifth embodiment of the present invention, when real-time processing is required, the timing of transmission of the PS-Poll is determined independently of both the timing of transmission of send data and the beacon interval differently from the fourth embodiment. Namely, the PS-Poll is spontaneously transmitted from the radio terminal unit to the radio base station at intervals corresponding to communication applications. Therefore, even in asymmetrical communication, such as broadcast, multicast and simultaneous transmissive communication, that requires real-time processing, it is possible to reduce the rate of collisions, which often take place when the timing of transmission of the PS-Poll is determined based on the beacon interval because a plurality of radio terminal units transmit the PS-Polls to one radio base station all at once immediately after the receipt of a beacon. Thus, delay in receiving packets from the radio base station can be reduced, and the quality of communication can be improved.

Additionally, the fifth embodiment of the present invention may be applicable in combination with the first, second and/or fourth embodiment.

In the following, a description will be made of the sixth embodiment of the present invention.

Figure 12:
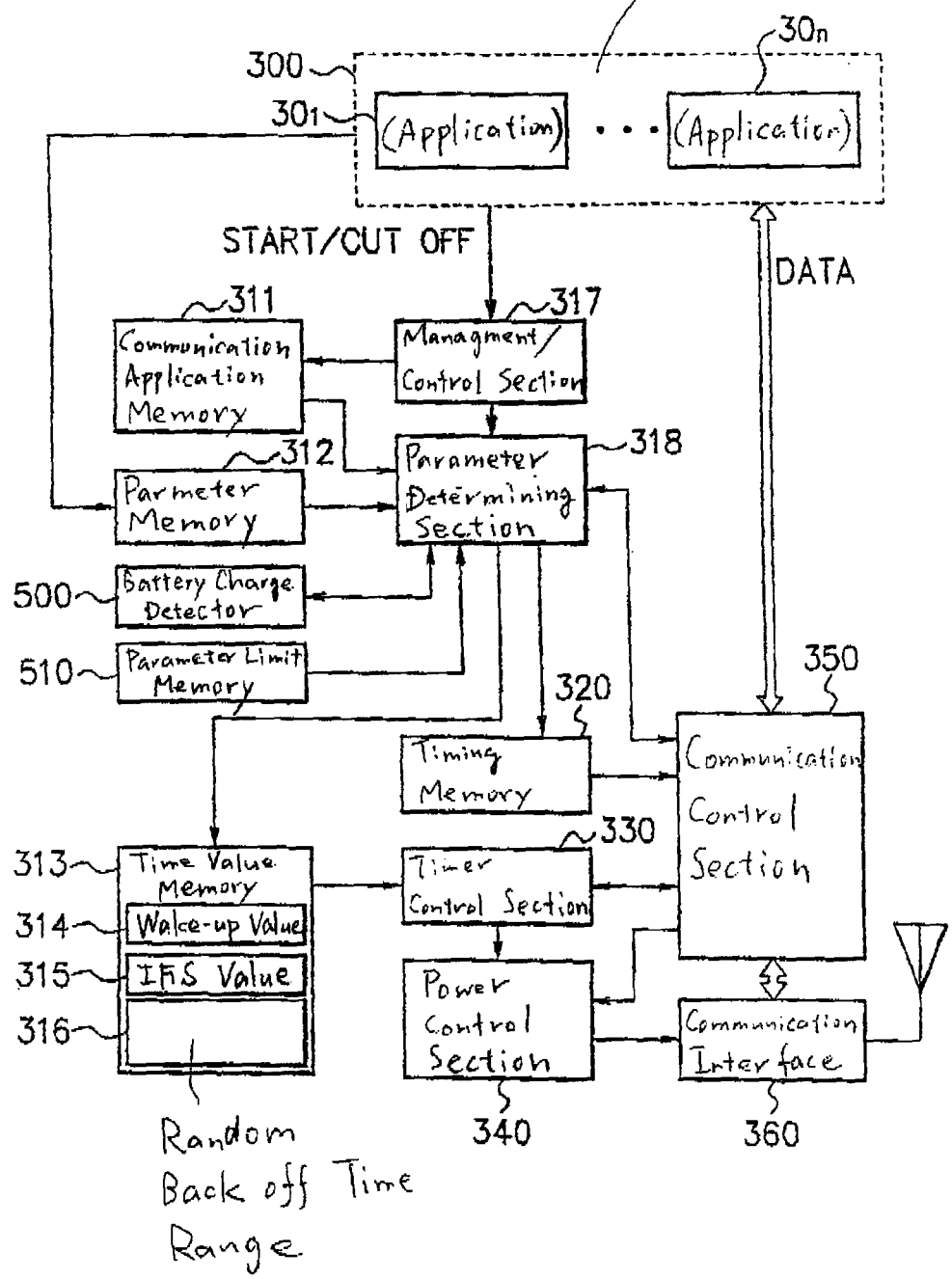
FIG. 12 is a block diagram showing the configuration of a radio terminal unit according to the sixth embodiment of the present invention.

FIG. 12 is a block diagram showing the configuration of a radio terminal unit according to the sixth embodiment of the present invention. The radio terminal unit shown in FIG. 12 is in many respects basically similar to that of the fourth embodiment shown in FIG. 9 except for the presence of a battery charge detector 500 and a parameter limit memory 510, and similar numbers are utilized in designating corresponding portions of the terminal unit. Further, the operation mode determination section 310 operates differently from those of the first to third embodiments shown in FIG. 4, and the parameter determining section 318 operates differently from those of the fourth and fifth embodiments shown in FIG. 9.

Upon receipt of a request to detect the remaining battery charge from the parameter determining section 318, the battery charge detector 500 measures the remaining amount of battery charge. Then, the battery charge detector 500 informs the parameter determining section 318 of the remaining amount.

Figure 13:
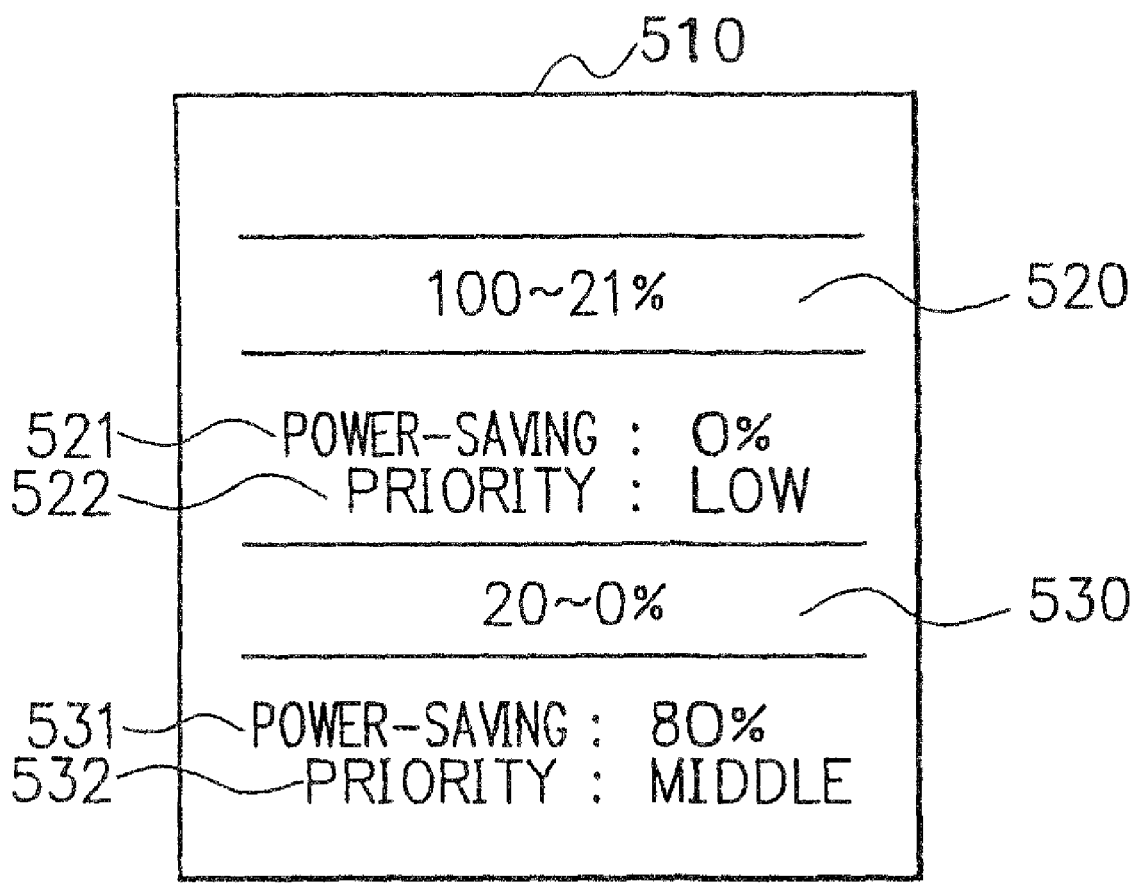
FIG. 13 is a diagram showing an example of the contents of a parameter limit memory depicted in FIG. 12.

FIG. 13 is a diagram showing an example of the contents of the parameter limit memory 510. As can be seen in FIG. 13, the parameter limit memory 510 stores limits 521 and 531 on the power-saving rate and limits 522 and 532 on the priority of communication set for the ranges of proportions of remaining battery charge 520 and 530. These limits are stored in the parameter limit memory 510 in advance.

The parameter determining section 318 reads the limits out of the parameter limit memory 510. The parameter determining section 318 sets the respective values stored in the timer value memory 313 with reference to the limits which have been set with respect to each range of proportions of remaining battery charge differently from the aforementioned operation mode determination section 310 or parameter determining section 318 in the first to fifth embodiments.

In the following, a description will be given of the operation of the radio terminal unit according to the sixth embodiment of the present invention with reference to FIGS. 13 and 14. The sixth embodiment is in many respects basically similar to the above-mentioned embodiments, and, therefore, only the operation of the parameter determining section 318 will be described.

Figure 14:
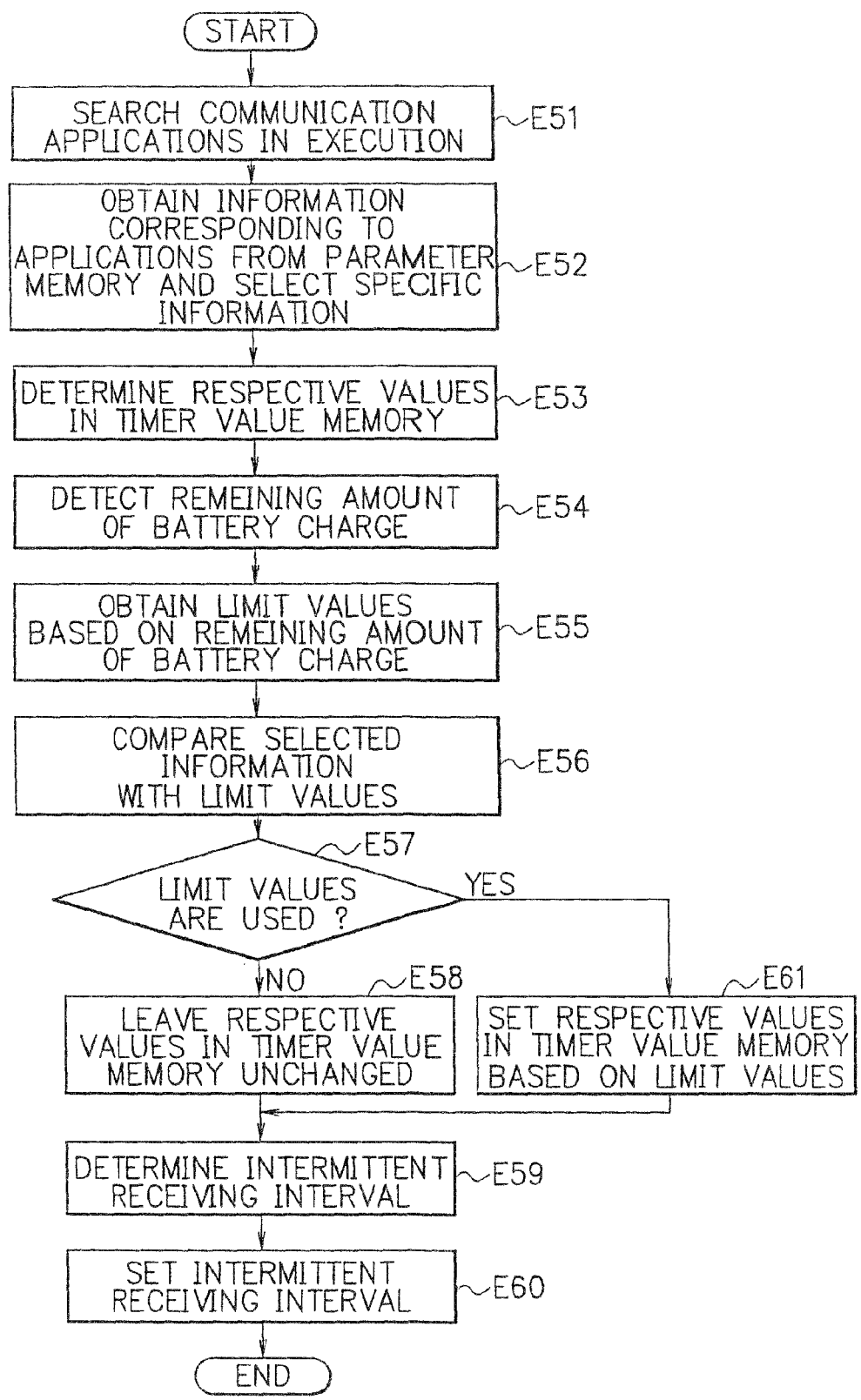
FIG. 14 is a flowchart for explaining part of the operation of the radio terminal unit according to the sixth embodiment of the present invention.

FIG. 14 is a flowchart for explaining part of the operation of the parameter determining section 318 according to the sixth embodiment of the present invention. As in the above-mentioned fourth and fifth embodiments, the parameter determining section 318 searches the communicating application memory 311 for applications currently being in communication (step E51). Next, the parameter determining section 318 searches the parameter memory 312 to obtain information, such as power-saving rate and priority corresponding to all the communication applications, and select specific information, for example, the lowest power-saving rate and the highest priority (step E52), and determines the respective values to be stored in the timer value memory 313 according to the selected information (step E53).

After that, in the sixth embodiment, the parameter determining section 318 obtains the proportion of remaining battery charge from the battery charge detector 500 (step E54).

Subsequently, the parameter determining section 318 obtains limits from the parameter limit memory 510 based on the proportion of remaining battery charge to set the respective values in the timer value memory 313 (step E55). Then, the parameter determining section 318 compares the information selected at step E52 with the limits obtained at step E55 (step E56).

Based on the result of the comparison at step E56, the parameter determining section 318 determines whether to use the information selected at step E52 or the limits obtained at step E55. A choice between the two is made depending on the comparison result.

For example, in the case of determining the power-saving rate, the parameter determining section 318 compares the power-saving rate selected at step E52 with the limit on the power-saving rate obtained at step E55. If the power-saving rate selected at step E52 is equal to or higher than the limit, the parameter determining section 318 determines to use the power-saving rate selected at step E52 (step E57, NO). Consequently, the respective values in the timer value memory 313 determined at step E53 remain the same (step E58). On the other hand, when the power-saving rate selected at step E52 is lower than the limit, the limit is to be used (step E57, YES). That is, the parameter determining section 318 resets the respective values in the timer value memory 313 according to the limit (step E61).

In the case of determining the priority, if the priority selected at step E52 is equal to or higher than the limit on priority obtained at step E55, the parameter determining section 318 determines to use the priority selected at step E52 (step E57, NO). On the other hand, when the priority selected at step E52 is lower than the limit, the limit is to be used (step E57, YES).

Thereby, when the remaining amount of battery charge has reduced to less than a certain value, the radio terminal unit does not carry out the intermittent receiving operation at an interval shorter than the intermittent receiving interval which has been determined based on the limits set in the parameter limit memory 510. In addition, an application can be terminated normally by increasing the priority of communication.

In accordance with the sixth embodiment of the present invention, the radio terminal unit includes the battery charge detector 500 and the parameter limit memory 510. With this construction, it becomes possible to adjust or reset the power-saving rate when remaining battery charge has reduced so that the radio terminal unit can be used as long as possible. Moreover, an application can be terminated normally before abruptly interrupted during communication.

Incidentally, the battery charge detector 500 may regularly check remaining battery charge. In this case, when the battery charge detector 500 detects that the proportion of remaining battery charge has changed and come to fall in another range of proportions of remaining battery charge with reference to the parameter limit memory 510, the detector 500 informs the parameter determining section 318 about this. On receipt of the information from the battery charge detector 500, the parameter determining section 318 updates the respective values stored in the timer value memory 313 if necessary. Thereby, it is possible to respond to a change in remaining battery charge during communication.

Additionally, the sixth embodiment of the present invention may be applicable in combination with the third, fourth and/or fifth embodiment.

While a description has been made of communication between the radio terminal unit (110, 120) and the terminal unit 130 that is connected to a LAN or a WAN, the radio terminal unit 110 can communicate with the radio terminal unit 120 connected to the same radio base station 100 in a similar manner.

Besides, when real-time processing is required, the radio terminal unit may conduct the intermittent receiving operation at DTIM beacon intervals together with the intermittent receiving operation according to the present invention. By this means, the radio terminal unit does not miss receiving a multicast/broadcast packet.

In the above-described embodiments, a "VoIP" application is taken as an example of the communication application which is running on the radio terminal unit. However, the radio terminal unit of the present invention operates in a similar manner with any other communication application such as "television-phone", "chat", "web browser" and "instant message".

In the above-described embodiments, the communication application section 300 sets necessary parameters for respective communication applications in the operation mode determination section 310. However, the parameters may be set in the operation mode determination section 310 beforehand. In addition, the parameters may be automatically changed according to the contents of communicated data.

As set forth hereinabove, in accordance with the present invention, the timing of transmission of the control packet can be changed according to the operation mode of one or more communication at the radio terminal unit side irrespective of the beacon interval. Consequently, even when there is any application being in communication on the radio terminal unit, electric power consumption by the terminal unit can be reduced as much as possible. As a result, available time of the radio terminal unit can be prolonged.

In a conventional radio communication system, each radio terminal unit sends a radio base station the PS-Poll for receiving packets buffered in the radio base station based on the receipt of a beacon. Therefore, when a plurality of radio terminal units are connected to one radio base station and communication applications that require real-time processing, such as a "VoIP" application, are running on them, it often happens that the radio terminal units transmit the PS-Polls to the radio base station all at once immediately after the receipt of a beacon, thereby causing collisions.

However, according to the present invention, when real-time processing is required, the radio terminal units transmit the PS-Polls to the radio base station based on the timing of generation of send data therein. Thereby, it is possible to reduce the rate of collisions, which often take place in the conventional system due to traffic congestion after the transmission of a beacon. Thus, waiting time on the occasion of data transmission can be reduced. Thus, it is possible to prevent the deterioration of voice quality in real-time communication such as voice communication.

Moreover, the radio terminal unit that performs the intermittent receiving operation can freely change the intermittent receiving interval by the setting on the radio terminal unit side only regardless of the radio base station. That is, each radio terminal unit can change its intermittent receiving interval without being affected by other radio terminal units connected to the same radio base station. Thus, in the case where a plurality of radio terminal units are connected to one radio base station, the respective radio terminal units can perform the intermittent receiving operation at their individual intermittent receiving intervals.

Further, there is no need for any special radio base station since the radio terminal unit that performs the intermittent receiving operation can freely change the intermittent receiving interval by the setting on the radio terminal unit side only regardless of the radio base station. Consequently, many existing radio base stations are readily available.

Still further, in most cases, the radio terminal unit that performs the intermittent receiving operation of the present invention transmits the PS-Poll to the radio base station before receiving a beacon. Consequently, the radio terminal unit can receive its packets earlier as compared to the radio terminal unit that operates in an ordinary intermittent receiving mode in synchronism with DTIM beacons. Accordingly, delays in packet delivery can be reduced. Thus, it is possible to improve voice quality in real-time communication such as voice communication.

While the present invention has been described with reference to the particular illustrative embodiments, it is not to be restricted by the embodiments but only by the appended claims. It is to be appreciated that those skilled in the art can change or modify the embodiment without departing from the scope and spirit of the present invention.

What is claimed is:

1. A radio terminal unit which runs in power-saving mode and sends a radio base station a control packet for requesting delivery so as to receive packets buffered by the radio base station, comprising:
   an operation mode of communication application determination unit for determining operation mode of one or more communication which is operated at the radio terminal unit;
   a control packet changing unit for changing a timing of transmission of the control packet according to the operation mode of one or more communication applications determined by the operation mode of communication application determination unit; and
   a communication control section for sending the control packet according to the timing of transmission changed by the control packet changing unit after the transmission of data from the application.

2. The radio terminal unit claimed in claim 1, wherein the timing of transmission of the control packet is changed by the control packet changing unit regardless of a beacon interval.

3. The radio terminal unit claimed in claim 1, wherein the communication control section selects whether or not to transmit the control packet according to the operation mode of one or more communication applications which are determined by the operation mode of communication application determination unit.

4. The radio terminal unit claimed in claim 3, wherein the communication control section requests a power control section to turn on the power when the control packet is transmitted.

5. The radio terminal unit claimed in claim 1, wherein the communication control section requests a power control section to turn off the power after the data reception by the control packet.

6. A radio communication system which is a radio network system, comprising:
   one or more radio base stations; and
   one or more radio terminal units which runs in power-saving mode and sends a radio base station a control packet for requesting delivery so as to receive packets buffered by the radio base station, comprising:
   an operation mode of communication application determination unit for determining operation mode of one or more communication which is operated at the radio terminal unit;
   a control packet changing unit for changing a timing of transmission of the control packet according to the operation mode of one or more communication applications determined by the operation mode of communication application determination unit; and a communication control section for sending the control packet according to the timing of transmission changed by the control packet changing unit after the transmission of data from the application.

7. A communication control method of a radio terminal unit which runs in power-saving mode and sends a radio base station a control packet for requesting delivery so as to receive packets buffered by the radio base station, comprising an operation mode of communication application determination step of determining operation mode of one or more communication which is operated at the radio terminal unit and a communication control step of sending the control packet after the transmission data from the application according to the timing of transmission of the control packet changed according to the operation mode of one or more communication applications determined by the operation mode of communication application determination step.

8. The communication control method claimed in claim 7, wherein the timing of transmission of the control packet is changed by the communication control step regardless of a beacon interval.

9. The communication control method claimed in claim 7, wherein the communication control step selects whether or not to transmit the control packet according to the operation mode of one or more communication applications which are determined by the operation mode of communication application determination step.

10. The communication control method claimed in claim 9, wherein the communication control step requests a power control section to turn on the power when the control packet is transmitted.

11. The communication control method claimed in claim 7, wherein the communication control step requests a power control section to turn off the power after the data reception by the control packet.

\* \* \* \* \*